US011568246B2

(12) United States Patent
Yeh et al.

(10) Patent No.: US 11,568,246 B2
(45) Date of Patent: Jan. 31, 2023

(54) SYNTHETIC TRAINING EXAMPLES FROM ADVICE FOR TRAINING AUTONOMOUS AGENTS

(71) Applicant: SRI International, Menlo Park, CA (US)

(72) Inventors: Chih-hung Yeh, Alameda, CA (US); Melinda T. Gervasio, Mountain View, CA (US); Karen L. Myers, Menlo Park, CA (US); Daniel J. Sanchez, Sunnyvale, CA (US); Matthew Crossley, San Mateo, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 407 days.

(21) Appl. No.: 16/810,324

(22) Filed: Mar. 5, 2020

(65) Prior Publication Data

US 2020/0356855 A1 Nov. 12, 2020

Related U.S. Application Data

(60) Provisional application No. 62/845,601, filed on May 9, 2019.

(51) Int. Cl.

| | |
|---|---|
| ***G06F 40/30*** | (2020.01) |
| ***G06N 3/08*** | (2006.01) |
| ***G06N 3/04*** | (2006.01) |

(52) U.S. Cl.

CPC ............... *G06N 3/08* (2013.01); *G06F 40/30* (2020.01); *G06N 3/04* (2013.01)

(58) Field of Classification Search

CPC .......... G10L 15/16; G10L 15/22; G06N 3/088

See application file for complete search history.

(56) References Cited

U.S. PATENT DOCUMENTS

| | | | | |
|---|---|---|---|---|
| 9,704,054 B1 | | 7/2017 | Tappen et al. | |
| 10,916,333 B1 * | | 2/2021 | Yeturu .................. | G06N 5/003 |

(Continued)

OTHER PUBLICATIONS

Efron et al., "The bootstrap estimate of standard error," Chapter 6: An introduction to the bootstrap, Chapman & Hall, 1993, 12 pp. (Applicant points out, in accordance with MPEP 609.04(a), that the year of publication, 1993, is sufficiently earlier than the effective U.S. filing date of the present application and any foreign priority date, so that the particular month of publication is not in issue.).

(Continued)

*Primary Examiner* — Daniel Abebe

(74) *Attorney, Agent, or Firm* — Shumaker & Sieffert, P.A.

(57) ABSTRACT

Techniques are disclosed for training a machine learning model to perform actions within an environment. In one example, an input device receives a declarative statement. A computation engine selects, based on the declarative statement, a template that includes a template action performable within the environment. The computation engine generates, based on the template, synthetic training episodes. The computation engine further generates experiential training episodes, each experiential training episode collected by a machine learning model from past actions performed by the machine learning model. Each synthetic training episode and experiential training episode comprises an action and a reward. A machine learning system trains, with the synthetic training episodes and the experiential training episodes, the machine learning model to perform the actions within the environment.

20 Claims, 10 Drawing Sheets

(56) References Cited

U.S. PATENT DOCUMENTS

| | | | | |
|---|---|---|---|---|
| 2017/0178245 | A1 | 6/2017 | Rodkey | |
| 2020/0074273 | A1 | 3/2020 | Schmidt et al. | |
| 2020/0160150 | A1 | 5/2020 | Hashemi et al. | |
| 2020/0302924 | A1* | 9/2020 | Andreica | G10L 15/02 |
| 2020/0349395 | A1* | 11/2020 | Nushi | G06K 9/6257 |
| 2021/0027222 | A1* | 1/2021 | Rando | G06F 40/205 |
| 2021/0256310 | A1* | 8/2021 | Roberts | G06N 20/00 |
| 2021/0294944 | A1* | 9/2021 | Nassar | B60W 50/00 |
| 2021/0334696 | A1* | 10/2021 | Traut | G06F 11/3466 |

OTHER PUBLICATIONS

Eriksen et al., "Allocation of attention in the visual field," Journal of Experimental Psychology: Human Perception and Performance: 11(5), Oct. 1985, pp. 583-597.
Fitts et al., "Human performance," Oxford, England: Brooks/Cole, 1967, 53 pp. (Applicant points out, in accordance with MPEP 609.04(a), that the year of publication, 1967, is sufficiently earlier than the effective U.S. filing date of the present application and any foreign priority date, so that the particular month of publication is not in issue.).
Henke, "A model for memory systems based on processing modes rather than consciousness," Nature Reviews Neuroscience: vol. 11, Jul. 2010, pp. 523-532.
Mostow, "Machine transformation of advice into a heuristic search procedure," Chapter 12: Machine Learning, Morgan Kaufmann, 1983, pp. 367-403 (Applicant points out, in accordance with MPEP 609.04(a), that the year of publication, 1983, is sufficiently earlier than the effective U.S. filing date of the present application and any foreign priority date, so that the particular month of publication is not in issue.).
Rozanov et al., "The specificity of memory for a highly trained finger movement sequence: Change the ending, change all," Elsevier, Brain Research: 1331, Mar. 2010, pp. 80-87.
Sutton et al., "Reinforcement Learning: An Introduction," MIT Press: Second Edition, Oct. 19, 2018, 548 pp.
Toro Icarte et al., "Advice-based exploration in model-based reinforcement learning," in Proceedings of the Thirty-First Canadian Conference in Artificial Intelligence, Apr. 2018, 5 pp.
Abbeel et al., "Apprenticeship learning via inverse reinforcement learning," ACM, Proceedings of the Twenty-First International Conference on Machine Learning, ICML '04, Jul. 2004, 8 pp.
Abel et al., "Agent-Agnostic Human-in-the-Loop Reinforcement Learning," Curran Associates, Proceedings of the NIPS 2016 Workshop on the Future of Interactive Learning Machines, Dec. 5-10, 2016, 13 pp.
Anderson, "Acquisition of Cognitive Skill," American Psychological Association, Inc., Psychological Review, 89(4), 1982, pp. 369-406 (Applicant points out, in accordance with MPEP 609.04(a), that the year of publication, 1982, is sufficiently earlier than the effective U.S. filing date, so that the particular month of publication is not in issue.).
Asgharbeygi et al.,"Guiding inference through relational reinforcement learning," Springer, Proceedings of the Fifteenth International Conference on Inductive Logic Programming, Aug. 10-13, 2005, pp. 20-37.
Bacon et al., "The Option-Critic Architecture," AAAI Press, Proceedings of the Thirty-First AAAI Conference on Artificial Intelligence (AAAI-17), Feb. 4-9, 2017, pp. 1726-1734.
Chaffin et al., "Preparing for memorized cello performance: the role of performance cues," Psychology of Music, 38(1), Jan. 1, 2010, 29 pp.
Christiano et al., "Deep Reinforcement Learning from Human Preferences," Curran Associates, Proceedings of the Thirty-First Annual Conference on Advances in Neural Information Processing Systems (NIPS 2017), Dec. 4-9, 2017, 9 pp.
De la CRUZ et al., "Pre-training Neural Networks with Human Demonstrations for Deep Reinforcement Learning," CoRR, abs/1709.04083, Sep. 12, 2017, pp. 8.
Ericcson et al., "The role of deliberate practice in the acquisition of expert performance," Psychological Review, vol. 100(3), Jul. 1993, pp. 363-406.
Eriksen et al., "Visual attention within and around the field of focal attention: A zoom lens model," Psychonomic Society, Perception & Psychophysics, 40(4), Aug. 4, 1986, pp. 225-240.
Flegal et al., "Overthinking skilled motor performance: Or why those who teach can't do," Psychonomic Society, Inc., Psychonomic Bulletin & Review, 15(5), Oct. 2008, pp. 927-932.
Gershman et al., "Reinforcement Learning and Episodic Memory in Humans and Animals: An Integrative Framework," Annual Review of Psychology, 68:101-128, Jan. 3, 2017, 30 pp.
Gersavio et al., "Explanation to Avert Surprise," Proceedings of the Explainable Smart Systems Workshop at the Twenty-Third International Conference on Intelligent User Interfaces, Mar. 2018, 4 pp.
Golding et al., "Learning General Search Control from Outside Guidance," Proceedings of the Tenth International Joint Conference on Artificial Intelligence (InIJCAI), Aug. 23, 1987, pp. 334-337.
Griffith et al., "Policy Shaping: Integrating Human Feedback with Reinforcement Learning," Curran Associates, Proceedings of the Twenty-Seventh Annual Conference on Advances in Neural Information Processing Systems, Dec. 5-10, 2013, 9 pp.
Hagemann et al., "Training perceptual skill by orienting visual attention," Human Kinetics, Inc., Journal of Sport and Exercise Psychology, 28(2), Apr. 2006, pp. 143-158.
Itti et al., "A Model of Saliency-Based Visual Attention for Rapid Scene Analysis," IEEE Transactions on Pattern Analysis and Machine Intelligence, vol. 20, No. 11, Nov. 1998, pp. 1254-1259.
Jimenez et al., "Implicit Sequence Learning with Competing Explicit Cues," The Quarterly Journal of Experimental Psychology Section A, 54, May 1, 2001, pp. 345-369.
Johnson et al., "The Malmo Platform for Artificial Intelligence Experimentation," AAAI Press, Proceedings of the Twenty-Fifth International Joint Conference on Artificial Intelligence, Jul. 9-15, 2016, pp. 4246-4247.
Subramanian et al., "Efficient Exploration in Monte Carlo Tree Search using Human Action Abstractions," Curran Associates, in Proceedings of the Future of Interactive Learning Machines Workshop at NIPS 2016, Dec. 5-10, 2016, 10 pp.
Knox et al., "Interactively Shaping Agents via Human Reinforcement: The TAMER framework," ACM, in Proceedings of the Fifth International Conference on Knowledge Capture, Sep. 2009, 8 pp.
Krening et al., "Learning From Explanations Using Sentiment and Advice in RL," IEEE Transactions on Cognitive and Developmental Systems, 9, Mar. 2017, pp. 44-55.
Kuhlmann et al., "Guiding a Reinforcement Learner with Natural Language Advice: Initial Results in RoboCup Soccer," AAAI Press, in Proceedings of the AAAI-04 Workshop on Supervisory Control of Learning and Adaptive Systems, Jul. 2004, 6 pp.
Kulkarni et al., "Hierarchical Deep Reinforcement Learning: Integrating Temporal Abstraction and Intrinsic Motivation," Curran Associates, in Proceedings of the Thirtieth Annual Conference on Advances in Neural Information Processing Systems, Dec. 5-10, 2016. 9 pp.
Kumaran et al., "What Learning Systems do Intelligent Agents Need? Complementary Learning Systems Theory Updated," Trends in Cognitive Sciences, vol. 20; No. 7, Jul. 2016, pp. 512-534.
Lin, "Self-Improving Reactive Agents Based on Reinforcement Learning, Planning and Teaching," Machine Learning; 8, May 1992, pp. 293-321.
Lin et al., "Explore, Exploit or Listen: Combining Human Feedback and Policy Model to Speed up Deep Reinforcement Learning in 3D Worlds," CoRR, abs/1709.03969, Sep. 12, 2017, 8 pp.
MacGlashan et al., "Interactive Learning from Policy-Dependent Human Feedback," PMLR, in Proceedings of the Thirty-Fourth International Conference on Machine Learning, vol. 70, Aug. 6-11, 2017, 10 pp.
MacLin et al., "Giving Advice about Preferred Actions to Reinforcement Learners Via Knowledge-Based Kernel Regression," AAAI Press, in Proceedings of the Twentieth National Conference on Artificial Intelligence, Jul. 9-13, 2005, 6 pp.

(56) References Cited

OTHER PUBLICATIONS

McCarthy, "Programs with Common Sense," Proceedings of the Teddington Conference on the Mechanization of Thought Processes, Dec. 1958, 15 pp.
McClelland et al., "Why There are Complementary Learning Systems in the Hippocampus and Neocortex: Insights From the Successes and Failures of Connectionist Models of Learning and Memory," Psychological Review, vol. 102, No. 3, Jul. 1995, pp. 419-457.
Milner et al., "Cognitive Neuroscience and the Study of Memory," Neuron, 20(3), Mar. 1998, pp. 445-468.
Mnih et al., "Playing Atari with Deep Reinforcement Learning," CoRR, abs/1312.5602, Dec. 19, 2013, 9 pp.
Myers, "Advisable Planning Systems," AAAI Press, ARPI 1996 Proceedings, Advanced Planning Technology, Jul. 1996, pp. 206-209.
Nason et al., "Soar-RL: Integrating Reinforcement Learning with Soar," Elsevier B.V, Cognitive Systems Research, 6(1), Mar. 2005, pp. 51-59.
Ng et al., "Algorithms for Inverse Reinforcement Learning," Morgan Kaufmann, in Proceedings of the Seventeenth International Conference on Machine Learning (ICML-2000), Jun. 29-Jul. 2, 2000, 8 pp.
Petersen et al., "The effects of practice on the functional anatomy of task performance," in Proceedings of the National Academy of Sciences (PNAS), 95(3), Feb. 1998, pp. 853-860.
Plappert, "keras-rl/keras-rl: Deep Reinforcement Learning for Keras," GitHub, Retrieved Aug. 14, 2020 from https://github.com/keras-rl/keras-rl, 2016, 5 pp. (Applicant points out, in accordance with MPEP 609.04(a), that the year of publication, 2016, is sufficiently earlier than the effective U.S. filing date, so that the particular month of publication is not in issue.).
Posner et al., "Attention and the Detection of Signals," Journal of Experimental Psychology, 109(2), Jun. 1980, pp. 160-174.
Reber et al., "Encapsulation of Implicit and Explicit Memory in Sequence Learning," Journal of Cognitive Neuroscience, 10(2), Mar. 1998, pp. 248-263.
Schaal, "Is Imitation Learning the Route to Humanoid Robots?," Trends in Cognitive Sciences, 3(6), Jun. 1999, 19 pp.
Sherry et al., "The Evolution of Multiple Memory Systems," Psychological Review, 94(4), Oct. 1987, pp. 439-454.
Silver et al., "Mastering the Game of Go without Human Knowledge," in Nature, 550, Oct. 2017, 43 pp.
Squire, "Memory systems of the brain: A brief history and current perspective," Elsevier, Inc., Neurobiology of Learning and Memory, 82, Nov. 2004, pp. 171-177.
Sun et al., "From Implicit Skills to Explicit Knowledge: A Bottom-Up Model of Skill Learning," Cognitive Science, 25(2), Mar. 2001, pp. 203-244.
Taylor et al., "The role of strategies in motor learning," Annals of the New York Academy of Sciences, 1251, Mar. 2012, 12 pp.
Towell et al., "Knowledge-based artificial neural networks," Artificial Intelligence, vol. 70, Issues 1-2, Oct. 1994, 45 pp.
Watkins et al., "Q-learning," Machine Learning, 8, May 1992, pp. 279-292.
Weber et al., "Imagination-Augmented Agents for Deep Reinforcement Learning," CoRR, abs/1707.06203, Jul. 19, 2017, 19 pp.
Weinberg, "Does imagery work? Effects on performance and mental skills," Journal of Imagery Research in Sport and Physical Activity, 3(1), Feb. 14, 2008, 22 pp.
Wintermute, "Using Imagery to Simplify Perceptual Abstraction in Reinforcement Learning Agents" AAAI Press, in Proceedings of the Twenty-Fourth AAAI Conference on Artificial Intelligence (AAAI-10), Jul. 11-15, 2010, pp. 1567-1573.
Wulf et al., "Motor skill learning and performance: A review of influential factors," Blackwell Publishing Ltd. 2009, Medical Education, vol. 44, Jan. 2010, pp. 75-84.
Xu et al., "Show, Attend and Tell: Neural Image Caption Generation with Visual Attention," in Proceedings of the 32nd International Conference on Machine Learning, PMLR 37, Jul. 7-9, 2015, 10 pp.
Yeh et al., "Bridging the Gap: Converting Human Advice into Imagined Examples," Advances in Cognitive Systems 7 (2018), Dec. 2018, pp. 117-136.
Perez-Liebana et al., "The Multi-Agent Reinforcement Learning in MalmÖ (Marlö) Competition," arXiv.org; cs-preprint, arXiv:1901.08129, Jan. 23, 2019, 4 pp.
Guss et al., "NeurIPS 2019 Competition: The MineRL Competition on Sample Efficient Reinforcement Learning using Human Priors," arXiv.org > cs > arXiv:1904.10079, Jul. 29, 2019, 28 pp.
"What is Minecraft?," Minecraft: Mojang Synergies AB, Retrieved from: https://www.minecraft.net/en-us/what-is-minecraft/, Accessed date: Oct. 10, 2019, 4 pp.
"Project Malmo—Microsoft Research," Microsoft, Retrieved from: https://www.microsoft.com/en-us/research/project/project-malmo/, Accessed date: Oct. 10, 2019, 7 pp.
Kirkpatrick et al., "Overcoming catastrophic forgetting in neural networks", Proceedings of the National Academy of Sciences, 114(13), Mar. 28, 2017, pp. 3521-3526.
Rebuffi et al., "iCaRL: Incremental Classifier and Representation Learning," in Proceedings of the IEEE Conference on Computer Vision and Pattern Recognition (CVPR), Jul. 2017, pp. 2001-2010.
Nguyen et al., "Variational Continual Learning," arXiv preprint arXiv:1710.10628, Nov. 3, 2017, 17 pp.
Masse et al., "Alleviating catastrophic forgetting using context-dependent gating and synaptic stabilization", arXiv preprint arXiv:1802.01569, Feb. 2, 2018, 12 pp.
Rusu et al., "Progressive Neural Networks," arXiv preprint arXiv:1606.04671, Jun. 21, 2016, 14 pp.
Fernando et al., "PathNet: Evolution Channels Gradient Descent in Super Neural Networks," arXiv preprint arXiv:1701.08734, Jan. 30, 2017, 16 pp.
Van de Ven et al., "Generative replay with feedback connections as general strategy for continual learning," arXiv preprint arXiv:1809.10635, Sep. 27, 2018, 17 pp.
Mocanu et al., "Online Contrastive Divergence with Generative Replay: Experience Replay without Storing Data," arXiv preprint arXiv:1610.05555, Oct. 18, 2016, 16 pp.
Shin et al., "Continual Learning with Deep Generative Replay", 31st Conference on Neural Information Processing Systems (NIPS 2017), Dec. 4-9, 2017, 10 pp.
Wei et al., "Differential roles of sleep spindles and sleep slow oscillations in memory consolidation," bioRxiv 153007 preprint, Jun. 21, 2017, 46 pp.
Wei et al., "Differential roles of sleep spindles and sleep slow oscillations in memory consolidation," PLOS Computational Biology, 14(7): e1006322, Jul. 9, 2018, 32 pp.
Isele et al. , "Selective Experience Replay for Lifelong Learning." arXiv preprint arXiv:1802.10269, Feb. 28, 2018, 9 pp.
Sohn et al., "Learning Structured Output Representation using Deep Conditional Generative Models," Advances in Neural Information Processing Systems 28 (NIPS 2015), Dec. 7-12, 2015, 9 pp.
Raghavan et al., "Generative Memory for Lifelong Reinforcement Learning," Neuro-Inspired Computational Elements (NICE 2019), Feb. 22, 2019, 3 pp.
U.S. Appl. No. 16/825,953, filed Mar. 20, 2020, naming inventors Raghavan et al.

* cited by examiner

With Saliency Masking

Standard

SYNTHETIC TRAINING EXAMPLES FROM ADVICE FOR TRAINING AUTONOMOUS AGENTS

This application claims the benefit of U.S. Provisional Application No. 62/845,601 by Yeh et al., entitled "SYNTHETIC TRAINING EXAMPLES WITH SALIENCY MAPPING FOR TRAINING AUTONOMOUS AGENTS," and filed on May 9, 2019. The entire content of Application No. 62/845,601 is incorporated herein by reference.

TECHNICAL FIELD

This disclosure generally relates to machine learning systems.

BACKGROUND

An autonomous system is a robot, machine, or software agent that performs behaviors or tasks with a high degree of autonomy. An autonomous system is typically capable of operating for an extended period of time with limited or no human intervention. A typical autonomous system is capable of gathering information about its environment and acting in the environment without human assistance. Further, an autonomous system uses such information collected from the environment to make independent decisions to carry out objectives.

Some autonomous systems may implement a machine learning system that applies a model generated by a neural network, such as a reinforcement learning network, to perform a specified task. Machine learning systems may require a large amount of "training data" to build an accurate model. However, once trained, machine learning systems may be able to perform a wide variety of tasks previously thought to be capable only by a human being. For example, autonomous systems that implement machine learning systems may be well suited to tasks in fields such as spaceflight, household maintenance, wastewater treatment, delivering goods and services, military applications, cyber security, network management, AI assistants, and augmented reality or virtual reality applications.

SUMMARY

In general, the disclosure describes techniques for training a machine learning model to perform actions within an environment. In one example, an input device receives a declarative statement. A computation engine selects, based on the declarative statement, a template that includes a template action performable within the environment. The computation engine generates, based on the template, synthetic training episodes (also referred to herein as "synthetic episodes"). The computation engine further generates experiential training episodes also referred to herein as "experiential episodes"), each experiential training episode gathered by a machine learning model from past actions performed by the machine learning model. Each synthetic training episode and experiential training episode comprises one or more actions and a reward. A machine learning system trains, with the synthetic training episodes and the experiential training episodes, the machine learning model to perform the actions within the environment.

In one example, this disclosure describes a computing system comprising: an input device configured to receive a declarative statement; a computation engine comprising processing circuitry, wherein the computation engine is configured to select, based on the declarative statement, a template that includes at least one template action that can be performed within an environment, wherein the computation engine is configured to generate, based on the template, one or more synthetic training episodes, each synthetic training episode comprising at least one action and at least one reward; and a machine learning system configured to train, with the one or more synthetic training episodes, a machine learning model to perform one or more actions within the environment.

In another example, this disclosure describes a method for training a machine learning model to perform one or more actions within an environment, the method comprising: receiving, by an input device, a declarative statement; selecting, by a computation engine comprising processing circuitry and based on the declarative statement, a template that includes at least one template action that can be performed within the environment; generating, by the computation engine and based on the template, one or more synthetic training episodes, each synthetic training episode comprising at least one action and at least one reward; and training, by a machine learning system and with the one or more synthetic training episodes, a machine learning model to perform the one or more actions within the environment.

In another example, this disclosure describes a non-transitory, computer-readable medium comprising instructions that, when executed, are configured to cause processing circuitry of a computing system to: execute a computation engine configured to: receive a declarative statement; select, based on the declarative statement, a template that includes at least one template action that can be performed within an environment; and generate, based on the template, one or more synthetic training episodes, each synthetic training episode comprising at least one action and at least one reward; and execute a machine learning system configured to train, with the one or more synthetic training episodes, a machine learning model to perform the one or more actions within the environment.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 10 is described with respect to FIG. 1.

Like reference characters refer to like elements throughout the figures and description.

DETAILED DESCRIPTION

Figure 1:
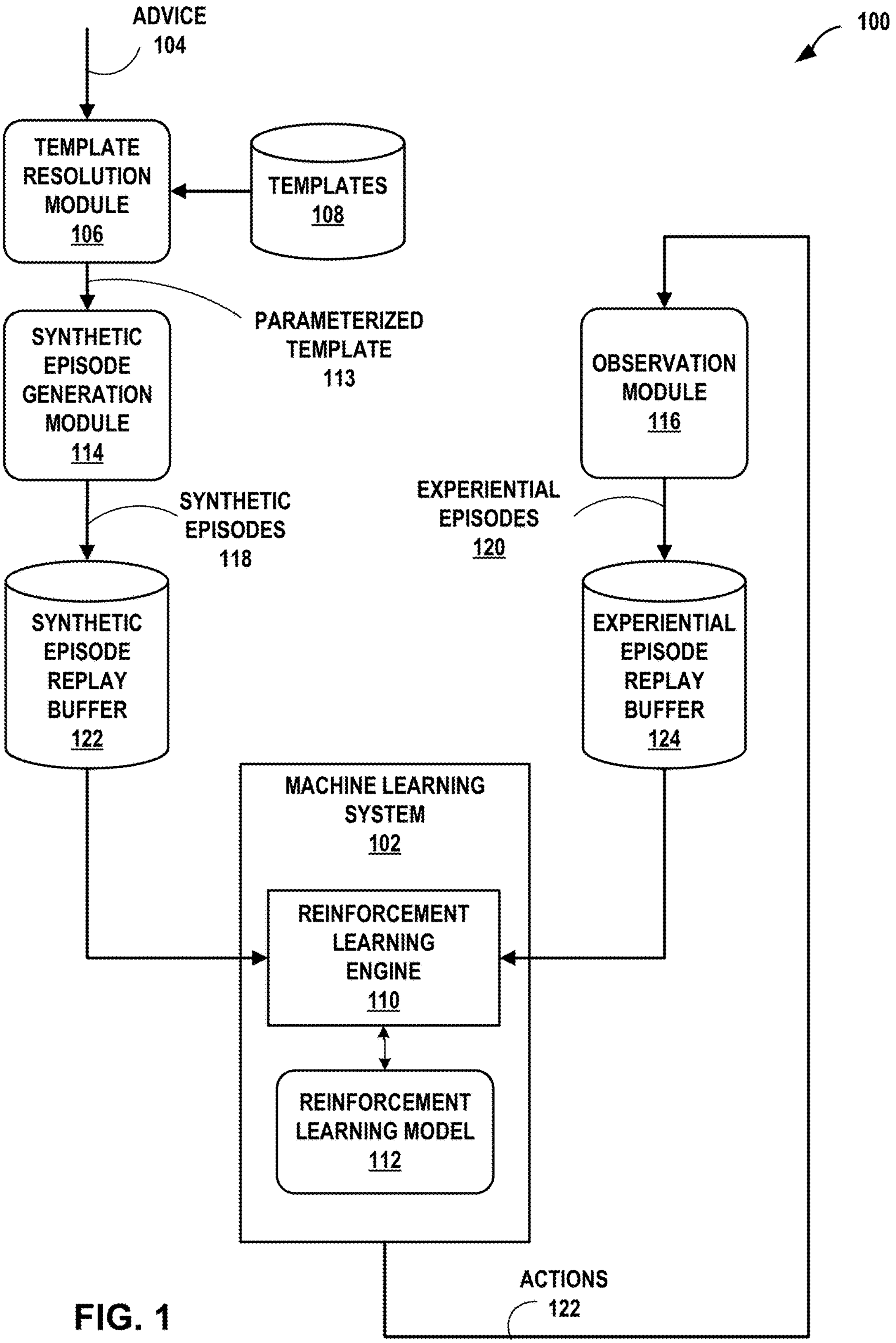
FIG. 1 is a block diagram illustrating an example system for training a reinforcement learning model with synthetic episodes and experiential episodes in accordance with the techniques of the disclosure.

Advice is a powerful tool for human learning. However, applying human advice to computing systems presents the challenge of bridging a gap between the high-level representations that easily capture human advice and the low-level representations with which a computing system must operate to use that advice. Delivering information in a way that can be appropriately used to improve performance can be a complex endeavor. For example, corrective advice that focuses a learner on internal components, such as motor control, in some cases may harm performance on achieving a related, external goal (e.g., the effects of the motor control on an external environment). This is hypothesized to be due to conflicting representations between abstract advice and low-level motor programs. This suggests that the ability to apply top-down, abstract advice on a simple, reactive learning system may require the advice to "scaffold" the low-level representation in the form of higher-level conceptual advice, rather than providing direct, low-level instruction. While this difference in knowledge representations is captured both in cognitive architectures and human neurophysiology, the ability to capture this scaffolding interaction model has yet to be explored.

Using the techniques of the disclosure, abstract advice provided by a human may be used to guide reinforcement learning for an autonomous agent. Human advice has been recognized as a powerful source of guidance for learning systems since the early days of artificial intelligence, and advice may be integrated into symbolic reasoning systems. Reinforcement learning provides an attractive paradigm for continuous, integrated learning and acting. While mathematically elegant, reinforcement learning systems are often limited to small, boutique domains due to their simplicity and inability to scale to complex problems. However, with the explosive success of deep learning during the previous several years, the use of neural function approximators to reduce complexity have demonstrated impressive gains. As reinforcement learning-trained autonomous systems become more widely used, a critical component for their acceptance is the ability for human users to advise and influence autonomy.

The flexibility and learning capability of reinforcement learning systems may be fused with extensions to allow for more complex thought. Examples include using reinforcement learning to learn an operator-selection policy in a cognitive system, supporting hierarchical deep Q-learning networks (DQN); developing goal-directed Monte Carlo rollouts to identify courses of action that best match human preferences and constraints; and other use cases. These approaches implicitly assume that a fundamentally reactive learning algorithm, on its own, such as reinforcement learning, cannot learn to exhibit more complex, goal-directed behavior. Ostensibly, general belief and intuition dictate that such simple algorithms must require additional cognitive machinery to exhibit complex behavior. As set forth by the techniques of the disclosure, another path is possible that forgoes heavy modification of the reinforcement learner or reactive learning algorithms.

A fundamental problem is that human-provided advice, which is abstract and rich in representation, is often not in a form readily usable by reinforcement learning-trained autonomous agents. In developing playbooks (e.g., libraries of procedural knowledge) for teams of autonomous agents, domain subject matter experts often impart their knowledge in the form of high-level goals or constraints, which current learning systems cannot use directly. Although attempts to incorporate advice into reinforcement learning systems have met with some success, other approaches tend to require heavy user involvement in the training process.

A key advantage of reinforcement learning-based systems is that reinforcement learning systems generally require little or no domain knowledge. Rather, reinforcement learning systems may learn strictly from examples garnered through experimentation. However, this focus on instance-based learning leads to a fundamental disconnect between human communication and standard approaches. Some examples of the differences between human-given advice and inputs accepted by reinforcement learning systems are set forth in Table 1 below. Thus, the challenge is in developing techniques that allow abstract human advice to be used to guide reinforcement learning.

TABLE 1

| | Human Advice | Reinforcement learning Inputs |
|---|---|---|
| Quantity | Low (order of 10) | Large (order of 1,000-1,000,000) |
| Conceptual Level | Higher level, more abstract | No abstractions, grounded in environment |
| Representation | Linguistic | Instance-based |

In accordance with the techniques of the disclosure, a reinforcement learning system is set forth that may convert human advice, guidance, and knowledge into synthetic or imagined training experiences. As set forth herein, a user may construct a series of narratives that embody key concepts and guidance for an autonomous agent, such as a machine learning system, autonomous vehicle, artificial intelligence, robot, or other self-guided computing device. The key concepts and guidance are drawn from an inventory of cognitive advice templates, and may be associated with a natural language phrase. The cognitive advice templates may be associated with a dynamics model and are used to sample an artificial trajectory to form scripted, synthetic training episodes. The synthetic training episodes serve to scaffold the low-level representations of simple, reactive learning systems such as reinforcement learners. For example, the reinforcement learning system disclosed herein may use the synthetic training episodes, in conjunction with real episodes experienced by the reinforcement learning system, as training experiences. The techniques disclosed herein may allow for an increase in learning rate by an autonomous agent operating within an environment.

Furthermore, the disclosure sets forth techniques for saliency masking of the synthetic episodes. Saliency masking is a form of instructor-guided hard-directed attention. Saliency masking involves masking out every observation element except for those observation elements deemed relevant for the lesson. Therefore, the use of saliency masking forces autonomous agent observations to focus only on the elements deemed relevant by the instructor. The use of saliency masking may result in significant gains in learning rates over the baseline learning system described herein.

Reinforcement learning systems and reactive learning methods require instantiated training examples to "learn" useful behavior within an environment. The learning behavior of reinforcement learning systems is in contrast to how humans present guidance, which is on an abstract conceptual level. The techniques described herein provide for a way to translate higher level, conceptual guidance into a larger set of "real enough" instances from which a reinforcement learning agent can "learn" or derive useful training.

Typically, human input to reinforcement learning systems is in the form of instantiated training examples. Such instantiated training examples may be, e.g., feedback on actions performed by an autonomous agent in an environment, or demonstrations of a successfully accomplished task.

In contrast, a reinforcement learning system as described herein matches concepts to templates representing a key idea or lesson. Each template has a world model that allows the system to sample a sequence of observations and key elements that embody that lesson. The system may generate, from the sequence of observations and key elements, a "script" from which an autonomous agent can practice many variants of the lesson. Therefore, using the techniques of the disclosure, a human user may communicate with a reinforcement learning agent on the level of concepts, whereas the reinforcement learning agent may receive a large set of instantiated training instances suitable for training the reinforcement learning agent.

A reinforcement learning system may use the techniques disclosed herein to improve performance of tasks within an environment. For example, a reinforcement learning system as described herein may perform a task to navigate an autonomous vehicle through an environment, move an avatar within an artificial reality environment, or configure a computer or applications. The techniques of the disclosure may simplify the process of generating training episodes for reinforcement learning systems performing such actions or tasks. Therefore, the techniques of the disclosure may reduce the burden of deploying reinforcement learning systems and the cost of training such systems. For example, a reinforcement learning system as described herein may require less training time and less training data as compared with other reinforcement learning systems. Furthermore, a reinforcement learning system as described herein may achieve higher rates of success in comparison with other types of reinforcement learning systems and may be more likely to operate in ways that a human advisor wishes them to. Therefore, the techniques of the disclosure may allow for the use of reinforcement learning systems on a wider basis.

FIG. 1 is a block diagram illustrating an example system 100 for training reinforcement learning model 112 with synthetic episodes 118 and experiential episodes 120 in accordance with the techniques of the disclosure. Machine learning system 102 represents one or more computing devices to perform operations described herein to process advice 104 from a human user, as well as observations from actions 122 taken by system 100 within an environment, to train reinforcement learning model 112. For example, machine learning system 102 may include processing circuitry and memory as described in further detail with respect to FIG. 2.

In the example of FIG. 1, machine learning system 102 includes reinforcement learning engine 110. Machine learning system 102 trains reinforcement learning engine 110 to perform one or more actions 122 to achieve a task or goal. In this example, machine learning system 102 trains reinforcement learning model 112 for reinforcement learning engine 110 to perform one or more actions 122 to achieve the task or goal. In some examples, reinforcement learning engine 110 attempts to evaluate one or more actions in an environment to maximize a cumulative reward. Reinforcement learning engine 110 attempts to balance exploration of unknown territory with exploitation of current knowledge. In contrast to supervised machine learning, in which a supervised machine learning system is trained (e.g., "learns") from training data that includes both input data and a correct conclusion, reinforcement learning engine 110 trains reinforcement learning model 112 with observations based on analysis of an outcome of an action that reinforcement learning engine 110 performed in the environment.

Typically, reinforcement learning engine 110 trains reinforcement learning model 112 to perform one or more actions 122 in pursuit of achieving a goal. The goal is associated with a high positive reward. In some examples, each action may be associated with a small, negative reward. In some examples, actions of a particular type may have high costs, e.g., if they consume a lot of resources. Further, environmental hazards may be associated with negative rewards of varying sizes. Actions taken by reinforcement learning engine 110 may result in a positive or negative reward, which depends on whether system 100 accomplished the goal and how many environmental hazards were encountered. In one example, an action may not be associated with a specific reward value. Observation module 116 classifies an environmental scenario, an action taken by reinforcement learning engine 110 in response to the environmental scenario, and a resulting reward as an experiential episode 120 (e.g., a situation, action, and result that reinforcement learning engine 110 has previously experienced). By evaluating multiple actions 122 in response to multiple environmental scenarios, reinforcement learning engine 110 may train reinforcement learning model 112 to maximize a reward for an environmental scenario.

For example, as depicted in FIG. 1, reinforcement learning engine 110 performs an action 122. Action 122 may be specific to the domain of system 100. For example, where system 100 is implemented within an autonomous vehicle, action 122 may include an action to accelerate, decelerate, stop, steer left or right, or activate or deactivate indicator lights, etc. As another example, where system 100 is implemented within a computer game or artificial reality, action 122 may include a movement action (e.g., left, right, forward, backward, up, down, jump, etc.) or a command to interact with the environment. For example, where system 100 is implemented within a computer game or artificial reality, action 122 may include a movement action (e.g., left, right, forward, backward, up, down, jump, etc.) or a command to interact with the environment. As another example, where system 100 is implemented within a robot or drone, action 122 may include an action to interact with the environment via one or more tools, sensors, appendages, etc. Reinforcement learning engine 110 may perform other types of actions relevant within a domain for which reinforcement learning engine 110 is deployed.

Observation model 116 observes the action 122 and generates an experiential episode detailing observations of the action 122 taken by reinforcement learning engine 110 and the outcome of the action 122. For example, an experiential episode 120 may reflect one or more environmental scenarios, an action 122 taken by reinforcement learning engine 110 in response to the one or more environmental scenarios, and a reward attributed to the action (e.g., either positive or negative) that reinforces, positively or negatively, the action taken by reinforcement learning engine 110 in response to the one or more environmental scenarios. Each experiential episode 120 is stored within experiential episode replay buffer 124 for future use.

Reinforcement learning engine 110 may select an experiential episode 118 from experiential episode replay buffer 124 for subsequent use in training reinforcement learning model 112. In some examples, reinforcement learning engine 110 selects an experiential episode 118 from experiential episode replay buffer 124 at random. In this fashion, reinforcement learning engine 110 may train reinforcement learning model 112 with rewards learned from past actions taken by reinforcement learning engine 110.

In accordance with the techniques of the disclosure, system 100 is further configured to convert human advice 104 into synthetic episodes 118 that may be used in conjunction with experiential episodes 120 to train reinforcement learning model 112. As depicted in the example of FIG. 1, system 100 receives human advice 104. Advice 104 may be high-level, conceptual instructions which specify one or more key elements and a lesson to be learned from the key elements. In some examples, advice 104 is in the form of a declarative statement that specifies one or more key elements.

Template resolution module 106 processes the advice to extract the one or more key elements and the lesson. Template resolution module 106 identifies a parameterized template of templates 108 for a domain related to the advice. Each of templates 108 includes one or more variables and at least one template action that can be performed within the environment. The template action specifies a sequence of interactions between one or more variables. Template resolution module 106 resolves one or more variables of the selected template for the domain with the one or more key elements and the lesson of the declarative statement of advice 104 to create parameterized template 113.

Synthetic episode generation module 114 generates, from parameterized template 113, one or more synthetic episodes 118 for storing in synthetic episode replay buffer 122. For example, synthetic episode generation module 114 defines the sequence of interactions of the template action with the resolved one or more variables of parameterized template 113 to generate synthetic episodes 118. Each of the synthetic episodes 118 may be in a substantially similar format to each of experiential episodes 120 such that reinforcement learning engine 110 may use synthetic episodes 118 for training reinforcement learning model 112. However, unlike experiential episodes 120, which observation module 116 builds from observations of actual experiences from actions performed by reinforcement learning engine 110, synthetic episodes 118 are formulated from human advice 104 and do not reflect the actual experiences of reinforcement learning engine 110.

In some examples, synthetic episode generation module 114 associates each of synthetic episodes 118 with a high-value reward obtained by reinforcement learning model 112. In some examples, synthetic episode generation module 114 handcrafts the reward for a synthetic episode to be specific to a particular type of advice 104. In some examples, synthetic episode generation module 114 generates a reward that is generic to one or more different types of advice 104. In some examples, synthetic episode generation module 114 may perform reward manipulation or reward design to generate values of rewards that are commesurate with different environmental criterial for the advice. For example, synthetic episode generation module 114 may consider an initial state s of the environment, an action a performed by machine learning system 102, a resulting state s' of the environment, and a resulting reward r for machine learning system 102 when designing an appropriate reward for the synthetic episode 118.

Reinforcement learning engine 110 selects one or more synthetic episodes 118 from synthetic episode replay buffer 122 and one or more experiential episodes 120 from experiential episode replay buffer 124. Reinforcement learning engine 110 trains, with the selected one or more synthetic episodes and the selected one or more experiential episodes, reinforcement learning model 112 to accomplish a task.

Accordingly, a system enabled by the techniques of the disclosure may use human advice 104 to generate synthetic training episodes, which may be used to train reinforcement learning model 112. Further, a system as described herein may use such synthetic training episodes in conjunction with experiential training episodes to train reinforcement learning model 112. A reinforcement learning system as described herein may demonstrate a higher learning rate as compared with a reinforcement learning system that uses only experiential training episodes. Furthermore, the use of human advice to generate training examples that a machine learning system can use for training may increase the usability of machine learning systems and reduce the complexity of training such systems to achieve desirable outcomes.

Figure 2:
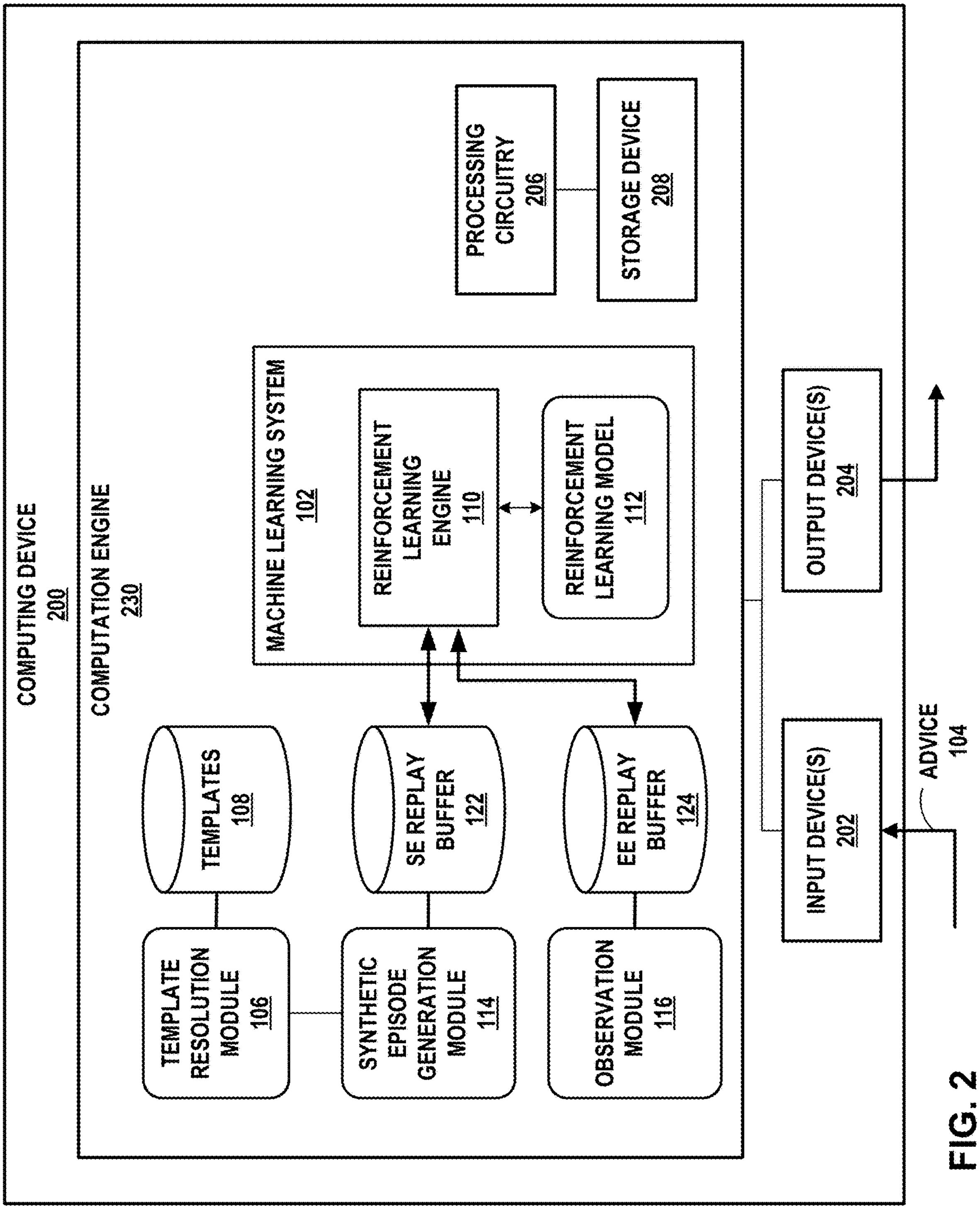
FIG. 2 is a block diagram illustrating an example computing system configured to execute the system of FIG. 1 in accordance with the techniques of the disclosure.

FIG. 2 is a block diagram illustrating an example computing system configured to execute the system of FIG. 1 in accordance with the techniques of the disclosure. In the example of FIG. 2, computing device 200 includes computation engine 230, one or more input devices 202, and one or more output devices 204.

In the example of FIG. 2, a user of computing device 200 may provide input specifying advice 104 to computing device 200 via one or more input devices 202. In some examples, advice 104 comprises a declarative statement. Advice 104 may be high-level, conceptual instructions and specifies one or more key elements and a lesson to be learned from the key elements. Input devices 202 may include a keyboard, pointing device, voice responsive system, video camera, biometric detection/response system, button, sensor, mobile device, control pad, microphone, presence-sensitive screen, network, or any other type of device for detecting input from a human or machine.

Computation engine 230 includes template resolution module 106, synthetic episode generation module 114, observation module 116, and machine learning system 102. Template resolution module 106, synthetic episode generation module 114, observation module 116, and machine learning system 102 may represent software executable by processing circuitry 206 and stored on storage device 208, or a combination of hardware and software. Such processing circuitry 206 may include any one or more of a microprocessor, a controller, a digital signal processor (DSP), an application specific integrated circuit (ASIC), a field-programmable gate array (FPGA), or equivalent discrete or integrated logic circuitry.

Computation engine 230 further includes templates 108, synthetic episode replay buffer 122, and experiential episode replay buffer 124. Computation engine 230 may store templates 108, synthetic episode replay buffer 122, and experiential episode replay buffer 124 on storage device 208. Storage device 208 may include memory, such as random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. In some examples, at least a portion of computing device 200, such as processing circuitry 206 and/or storage device 208, may be distributed across a cloud computing system, a data center, or across a network, such as the Internet, another public or private communications network, for instance, broadband, cellular, Wi-Fi, and/or other types of communication networks, for transmitting data between computing systems, servers, and computing devices.

Template resolution module 106 of computation engine 230 selects, based on the declarative statement, a template 108 of a plurality of templates 108. Each template 108 includes at least one template action that can be performed within an environment and one or more variables. The template action comprises a sequence of interactions between the one or more variables. Template resolution module 106 resolves the one or more variables with the key elements of the received declarative statement. Further, template resolution module 106 defines the sequence of interactions specified by template 108 with the resolved one or more variables to generate a parameterized template 113.

Synthetic episode generation module 114 generates, based on parameterized template 113, one or more synthetic training episodes 118. In some examples, synthetic episode generation module 114 generates, based on parameterized template 113 and a domain-specific action model for the environment of machine learning system 102, the one or more synthetic training episodes 118. In some examples, each synthetic training episode 118 includes at least one action and at least one reward. In some examples, synthetic episode generation module 114 generates synthetic training episodes 118 by applying saliency masking to preliminary synthetic training episodes to remove extraneous information from the preliminary synthetic training episodes.

Synthetic episode generation module 114 stores the one or more synthetic training episodes 118 in synthetic episode replay buffer 122. In some examples, synthetic episode generation module 114 stores the one or more synthetic training episodes 118 as one or more synthetic tuples. In some examples, each synthetic tuple is in the form <s, a, s', r> and comprises a synthetic initial state s of the environment, a synthetic action a performed by machine learning system 102, a synthetic resulting state s' of the environment, and a synthetic resulting reward r for machine learning system 102.

Observation module 116 collects one or more experiential episodes 120 that are based on an initial state of the environment, past actions performed by machine learning system 102 in response to the initial state, and an outcome of the past actions. In some examples, each experiential episode 120 includes at least one action and at least one reward. Observation module 116 stores the one or more experiential episodes 120 in experiential episode replay buffer 124. In some examples, Observation module 116 stores the one or more experiential episodes 120 as one or more experiential tuples. In some examples, each experiential tuple is in the form <s, a, s', r> and comprises a historical initial state s of the environment, a historical action a performed by machine learning system 102, a historical resulting state s' of the environment, and a historical resulting reward r for machine learning system 102.

Reinforcement learning engine 110 generates reinforcement learning model 112 from analysis of one or more experiential episodes 120 and one or more synthetic episodes 118 to perform one or more actions within the environment. For example, reinforcement learning engine 110 may train reinforcement learning model 112 by retrieving one or more synthetic tuples from synthetic episode replay buffer 122 and one or more experiential tuples from experiential episode replay buffer 124 and replaying the synthetic episodes 118 and experiential episodes 120 described by the respective synthetic tuples and experiential tuples to reinforcement learning model 112.

In some examples, reinforcement learning engine 110 may select from training reinforcement learning model 112 with synthetic training episode 118 and experiential episodes 120 in different ways. For example, reinforcement learning engine 110 may alternate between training reinforcement learning model 112 with a synthetic training episode 118 and training reinforcement learning model 112 with an experiential episode 120. As other examples, reinforcement learning engine 110 may use a number of synthetic training episode 118 and a number of experiential episodes 120 in different proportions to one another (e.g., reinforcement learning engine 110 may use a larger, smaller, or similar amount of synthetic training episode 118 as an amount of experiential episodes 120). In some examples, reinforcement learning engine 110 may use a number of synthetic training episodes 118 that is a ratio or proportion to a number of experiential episodes 120 used.

In some examples, reinforcement learning engine 110 may adapt between training reinforcement learning model 112 with synthetic training episodes 118 and training reinforcement learning model 112 with experiential episodes 120 based on one or more parameters of the environment. For example, reinforcement learning engine 110 may use environmental parameters to determine whether to sample only synthetic training episodes 118, only experiential episodes 120, both synthetic training episodes 118 and experiential episodes 120, and where both synthetic training episodes 118 and experiential episodes 120 are sampled, a proportion of synthetic training episodes 118 to experiential episodes 120. In some examples, reinforcement learning engine 110 may train reinforcement learning model 112 with synthetic training episodes 118 during a first period of time and train reinforcement learning model 112 with experiential episodes 120 during a second period of time. In some examples, reinforcement learning engine 110 may use only synthetic training episodes 118, only experiential episodes 120, or both synthetic training episodes 118 and experiential episodes 120 depending on a specific learning problem presented to reinforcement learning engine 110. In some examples, the one or more parameters of the environment are specified by or derived from the initial state s of the environment.

In an example where reinforcement learning model 112 is a DQN, reinforcement learning engine 110 updates one or more Q-value network parameters of reinforcement learning model 112 with the one or more synthetic and experiential tuples of the one or more synthetic episodes 118 and experiential episodes 120. While in the example of FIG. 2, machine learning system 102 implements a reinforcement learning network, in other examples other types of reactive neural networks may be used.

In some examples, output device 204 is configured to output, for presentation to a user, information pertaining to machine learning system 102. Output device 204 may include a display, sound card, video graphics adapter card, speaker, presence-sensitive screen, one or more USB interfaces, video and/or audio output interfaces, or any other type of device capable of generating tactile, audio, video, or other output. Output device 204 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In other examples, output device 204 may produce an output to a user in another fashion, such as via a sound card, video graphics adapter card, speaker, presence-sensitive screen, one or more USB interfaces, video and/or audio output interfaces, or any other type of device capable of generating tactile, audio, video, or other output. In some examples, output device 204 may include a presence-sensitive display that may serve as a user interface device that operates both as one or more input devices and one or more output devices.

Accordingly, a computing device enabled by the techniques of the disclosure may use human advice to generate synthetic training episodes, which may be used to train reinforcement learning model 112. Further, a computing device as described herein may use such synthetic training episodes in conjunction with experiential training episodes to train reinforcement learning model 112. A reinforcement learning system as described herein may demonstrate a higher learning rate as compared with a reinforcement learning system that uses only experiential training episodes. Furthermore, the use of human advice to generate training examples that a machine learning system can use for training may increase the usability of machine learning systems and reduce the complexity of training such systems to achieve desirable outcomes.

Figure 3:
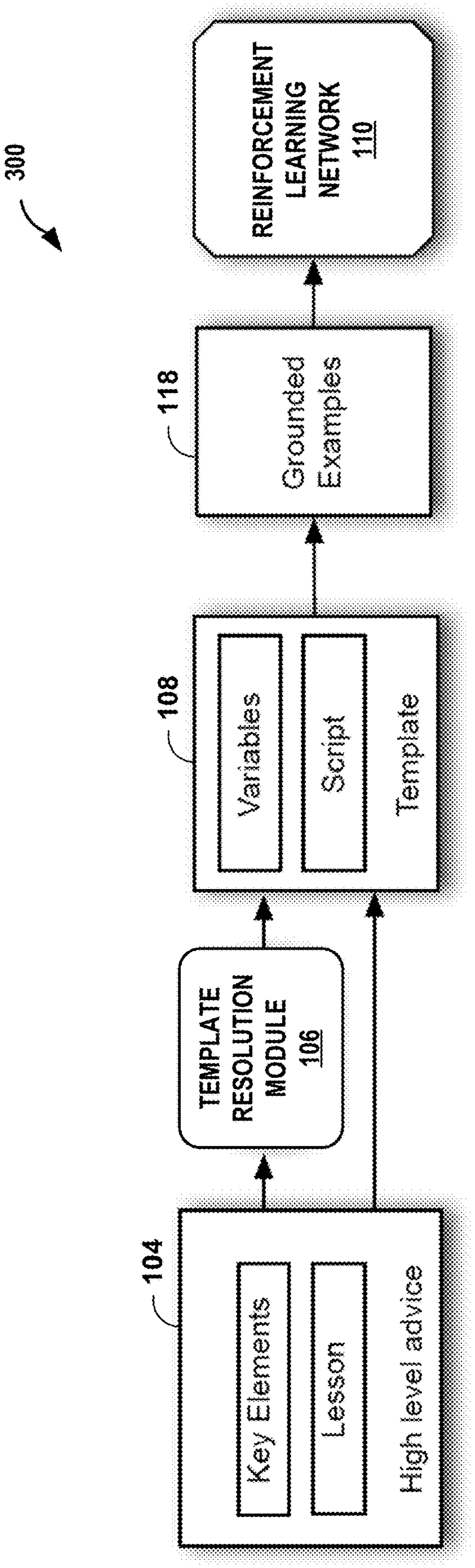
FIG. 3 is a block diagram illustrating an example scaffolding framework for generating synthetic episodes for training a reinforcement learning model in accordance with the techniques of the disclosure.

FIG. 3 is a block diagram illustrating an example scaffolding framework 300 for generating synthetic episodes for training a reinforcement learning model in accordance with the techniques of the disclosure. Specifically, scaffolding framework 300 converts human advice 104 into one or more synthetic episodes 118 suitable for training reinforcement leaning model 112 of reinforcement leaning network 110.

As depicted in FIG. 3, advice 104 is high level advice that includes one or more key elements and a lesson. Template resolution module 106 matches advice 104 to template 108, which includes a model for generating multiple instanced permutations representing the lesson in advice 104. The parameterized template 108 is converted to one or more ground examples, e.g., synthetic episodes 118, and made available to reinforcement leaning network 110 for training.

The techniques of the disclosure are concerned with how to take natural human advice—typically a symbolic, language-based input that relies on robust models of the environment—and use the advice to guide low-level (even model-free) reactive learners such reinforcement learning system 110. To bridge this gap, scaffolding framework 300 is set forth. Scaffolding framework 300, as depicted in FIG. 3, provides a framework for converting human advice 104 into inputs that can influence reactive learning algorithms such as reinforcement learning system 110. Scaffolding addresses the discrepancies between human-given advice and inputs accepted by reinforcement learning systems depicted in Table 1 above, such as the conceptual level of information and the quantity of inputs. Scaffolding framework 300, is guided by multiple memory systems theory and is based on the following core theoretical ideas:

Tenet 1: Cognitive systems should support complex interactions between abstract cognitive operations and simple, low-level reactive learning systems.

Tenet 2: Because reactive learning processes are encapsulated, advice does not interact directly with the knowledge representation but instead acts as a scaffold to guide the learning.

Tenet 3: Scaffolding can be realized through templates that generate synthetic training examples to shape the reactive learning.

Simple reactive learning systems can be trained to deal with complex problems without requiring large changes to the underlying algorithms. By taking human advice, such as advice 104, and developing cognitive templates that model the specific components of the environment that are most relevant for learning, scaffolding framework 300 may guide a reactive agent, such as reinforcement learning system 110, to learn faster while also minimizing the amount of environmental modeling required for high-level guidance.

As depicted in FIG. 3, advice 104 is composed of key elements and a lesson. Key elements are the minimal set of world elements that are needed to convey the lesson in the advice. Template resolution module 106 aligns advice 104 with a best matching template of templates 108. Each of templates 108 has variables and a script. Template resolution module 106 matches the variables of the selected template 108 with key elements from advice 104. The script of each template 108 comprises a sequence of abstract interactions between the variables and labels indicating a desirability of an outcome (e.g., a value of a reward). When a template 108 is reified by binding elements of advice 104 to the variables of the template 108, the script of the template generates, from elements of advice 104 and domain knowledge, a larger number of grounded instances. The grounded instances are referred to herein as synthetic episodes 118 and are suitable for use by reinforcement learning system 110 for training reinforcement learning model 112. The advice-derived training memories represented by synthetic episodes 118 may improve the learning rate for a deep reinforcement learning system.

Figure 4:
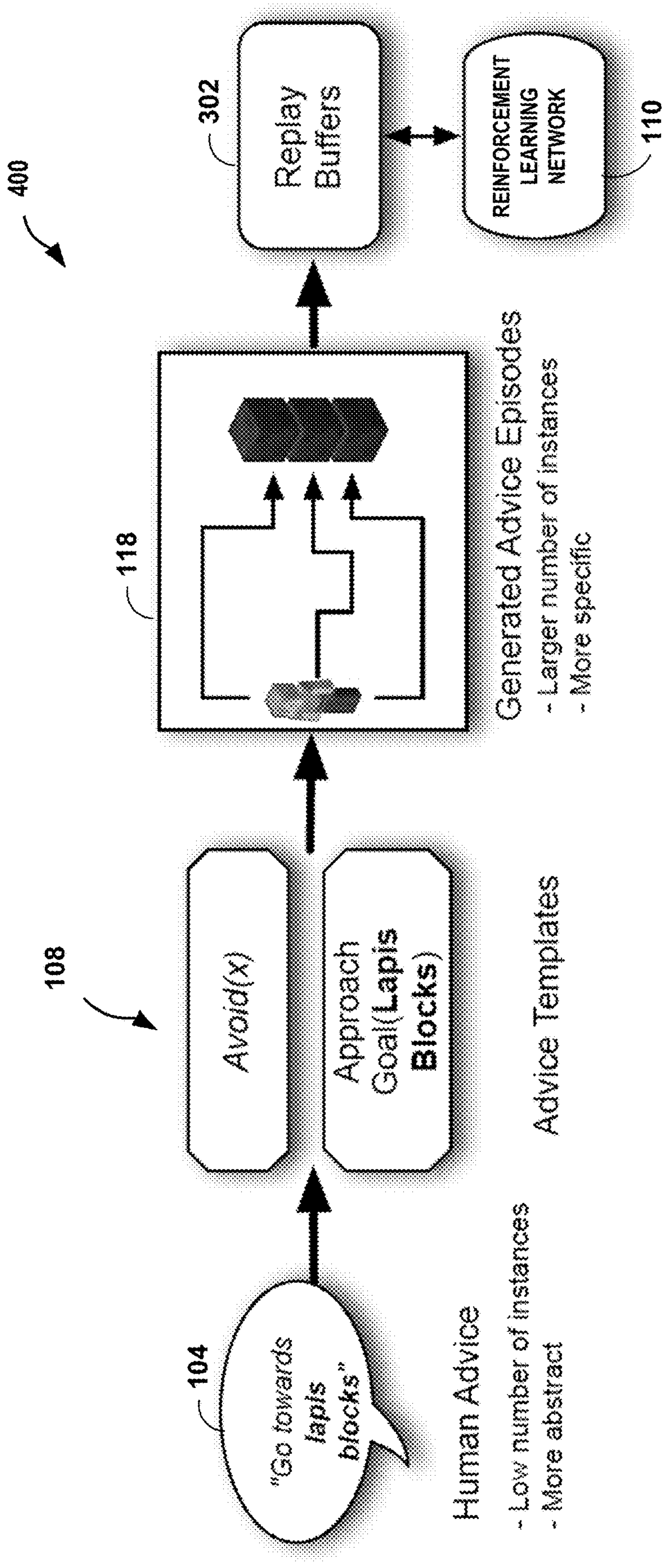
FIG. 4 is a block diagram illustrating another example scaffolding framework for generating synthetic episodes for training a reinforcement learning model in accordance with the techniques of the disclosure.

FIG. 4 is a block diagram illustrating an example scaffolding framework 400 for generating synthetic episodes for training a reinforcement learning model in accordance with the techniques of the disclosure. In some examples, scaffolding framework 400 is an example implementation of system 100 for training reinforcement learning model 112 with synthetic episodes 118 and experiential episodes 120, as depicted in FIG. 1.

As depicted in FIG. 4, a single piece of human advice 104 is matched against domain-relevant templates 108. Each of templates 108 are instantiated with world elements. Synthetic episode generation module 114 of FIG. 1 applies a simple action model to generate a larger number of synthetic training episodes 118 that illustrate key elements of advice 104. Synthetic training episodes 118, or "advice memories," are fed into replay buffers 302. Reinforcement learning engine 110 subsequently draws synthetic training episodes 118 from replay buffers 302 to "replay" episodes 118, thereby learning from episodes 118.

The techniques of the disclosure apply principles from cognitive psychology and skill acquisition to develop methods for how an autonomous agent can take high-level information and use it to guide low-level learning and representations. Expert skills rely on multiple, interacting memory systems, whereby a declarative system supports flexible knowledge representations that can be used to guide a procedural system that supports slow, inflexible learning through repetitive practice. Akin to providing advice to a reactive learning agent, a coach provides verbalizable input (e.g., high-level advice) to a student to disrupt an incorrect motor program (e.g., low-level procedural representation), otherwise known as deliberate practice. The abstract representation of advice serves as a "scaffold" to guide the development and production of low-level motor programs, which are characterized by their inflexible, encapsulated representations.

In accordance with the techniques of the disclosure, scaffolding framework 400 generates simple cognitive scaffolds, or templates, to guide a reinforcement learning agent through the learning process by constraining the search space for initial training of the reinforcement learning agent. Because reinforcement learning agents only learn through instance-based examples, much like a skill learner's procedural memory system, these templates are used to generate advice "episodes" (e.g., synthetic episodes 118) to guide learning. Synthetic episodes 118 are conceptually similar to the technique of mental imagery, where a learner mentally rehearses a desired behavior to improve skill learning and performance.

In certain circumstances, the use of templates 108 may lead to learning of incorrect information (i.e., spurious correlations). To reduce the likelihood that this may occur, a machine learning system may be enabled by the techniques set forth herein to perform "saliency masking." Saliency masking refers to a process where machine learning system 102 retains only the most relevant information in a synthetic episode 118. For example, if a synthetic episode 118 is focused on teaching an agent to avoid lava, synthetic episode generation module would retain only the lava in the environment when generating synthetic episodes 118. The use of saliency masking takes advantage of the theory that only a portion of the information in advice 104 may be useful for learning or training machine learning system 102 to make a decision. The use of saliency masking may enable implicit learning (such as may be the case for a reactive learning agent such as machine learning system 102) to learn complex rules from a high-dimensional space despite a lack of a clear, salient cue.

To implement the example advice scaffolding depicted in FIG. 4 on a reactive learner, such as machine learning system 102, a reinforcement learning machine learning system may be used. Reinforcement learning may provide advantages over other types of machine learning systems because it is one of the most fundamental algorithms for learning stimulus-response behaviors. This may allow any demonstrated improvements to be generalizable to other approaches (such as policy-gradient reinforcement-learning algorithms).

For example, machine learning system 102 may implement a Deep-Q network (DQN).

DQN is an effective state approximator that automatically learns a state representation without a large engineering overhead. Advice templates 108, and subsequent synthetic episodes 118, are simplified so as to appropriately constrain the reinforcement learning agent. To this end, templates 108 are structured to include an objective and a reward so as to reinforce a behavior (approach) or punish a behavior (avoidance). Therefore, advice templates 108 may reduce the burden on machine learning system 102 to isolate the minimal information required to focus the agent on the salient information that needs to be associated with the outcome. The use of advice templates 108 may mitigate a major challenge for reinforcement learning systems, e.g., the risk of learning spurious correlations between training observations and desired outcomes. Such spurious correlations may occur where a machine learning system considers each of the data points in an input to have equal weight, which is typically the case for a generic machine learning system. For example, an autonomous driving system that is incorrectly trained may favor braking a vehicle when heavy cloud cover is observed simply because the training dataset for the autonomous driving system was collected on a rainy and/or cloudy day. While statistics may be used to reduce the severity of this problem, creating a training dataset that has a sufficient quantity of training examples may be difficult or infeasible.

The techniques of the disclosure implement saliency masking by occluding portions of training observations to leave only the elements deemed essential for conveying the key lessons in a piece of advice. By minimizing the information available in the training episodes as described herein, advice framework 400 allows for the creation of synthetic training episodes 118 that reduce the likelihood that machine learning system 102 learns incorrect correlations between training observations and desired outcomes. Thus, saliency masking may allow for a reduction in the quantity of samples required in a training dataset to train machine learning system 102 to accurately achieve desired outcomes.

The techniques of the disclosure apply the following hypotheses:

Hypothesis 1. Templates based on human advice can be used to generate training episodes that enhance learning of a model-free reinforcement learning agent.

Hypothesis 2: Masking the environment so that only the most salient information is available enhances the reinforcement learning agent's ability to learn from the templates.

As depicted in the example of FIG. 4, a user provides human advice 104, such as "move toward target", in terms of existing templates and variables. While in the example of FIG. 4, advice 104 is aligned with templates 108, in some examples automated solutions for aligning templates to less formal representations, such as natural language, are used. Templates 108 are instantiated with world elements referenced in advice 104, making advice 104 more "concrete." In some examples, synthetic episode generation module 114 increases the quantity of data by generating a variety of synthetic episodes 118 illustrating a key element in a lesson specified by advice 104. Such synthetic episodes 118 are "imaginary" training episodes that typically comprise actions and results constructed internally from a domain-specific action model and the selected template 108. For example, the advice "move toward target" generates several different paths for reinforcement learning engine 110 to reach the target. These paths are stored into a bank of replay buffers 302. Replay buffers 302 are a memory store used by reinforcement learning system 110 to store experienced memories, which reinforcement learning system 110 may subsequently draw from for further learning.

In some examples, scaffolding framework 400 is applied to a reinforcement learning system. A reinforcement learning system (also referred to herein as a "reinforcement learning agent") learns how to operate in an environment to maximize cumulative reward. The reinforcement learning system does so by taking exploratory action in the environment, then accumulating positive and negative rewards as a result. The environment is typically formulated as a Markov decision process (MDP), which involves five elements:

- a finite set of states S
- a finite set of actions A
- a state transition function $T(s'|s, a)=Pr(S_{t+1}=s'|S_t=s, A_t=a)$ that specifies the probability of transitioning from one state to another given a particular action
- a reward function $R(s)\in\mathbb{R}$ over states
- a discount factor $\gamma\in[0,1]$ over future rewards The aim of a reinforcement learning system is to find an action-selection policy $\pi:S\times A\rightarrow[0,1]$ that will lead to the best reward outcome, without knowing either the state transition probability function or the reward function in advance.

There are numerous forms of reinforcement learning. In one example, reinforcement learning engine 110 implements Q-learning, a model-free algorithm that bypasses the state transition function and instead learns a function Q*(s,a) that captures the expected discounted reward from taking action a in state s and choosing actions. The optimal Q-value function, Q*(s,a), is computed by taking the action that leads to the greatest expected reward in subsequent time steps:

$$Q*(s,a) = \max_{\pi} E[r_t + \gamma r_{t+1} + \cdots \mid s_t = s, a_t = a, \pi]$$

In some examples, reinforcement learning engine 110 implements a DQN, a variant of Q-learning that uses neural networks to perform data-driven approximation of Q-values, yielding better generalizability over previous methods. A key component of many deep reinforcement learning systems, including DQN, is experience replay. Originally developed to improve sample efficiency and accelerate learning, experience replay has also been used to break temporal correlations that arise when estimating Q-values. In experience replay, reinforcement learning engine 110 stores observed interactions as experience tuples in replay buffer 302. An experience tuple <s, a, s', r> includes an initial state s, the action taken a, the resulting state s', and resulting reward r. Reinforcement learning engine 110 updates a Q-value estimate by sampling tuples in replay buffer 302, rather than only learning from recent tuples obtained from interaction with the environment.

As contemplated herein, there is no requirement that replay buffers 302 be given only actual environmental experience. Rather, the techniques of the disclosure enable the creation and use of synthetically-generated training memories (e.g., synthetic episodes 118) into one of replay buffers 302. By transforming user advice into synthetic episodes 118 and including synthetic episodes 118 in the learning updates, scaffolding framework 400 may implement a mechanism for using human guidance to influence the learning of reinforcement learning engine 110.

Figure 5:
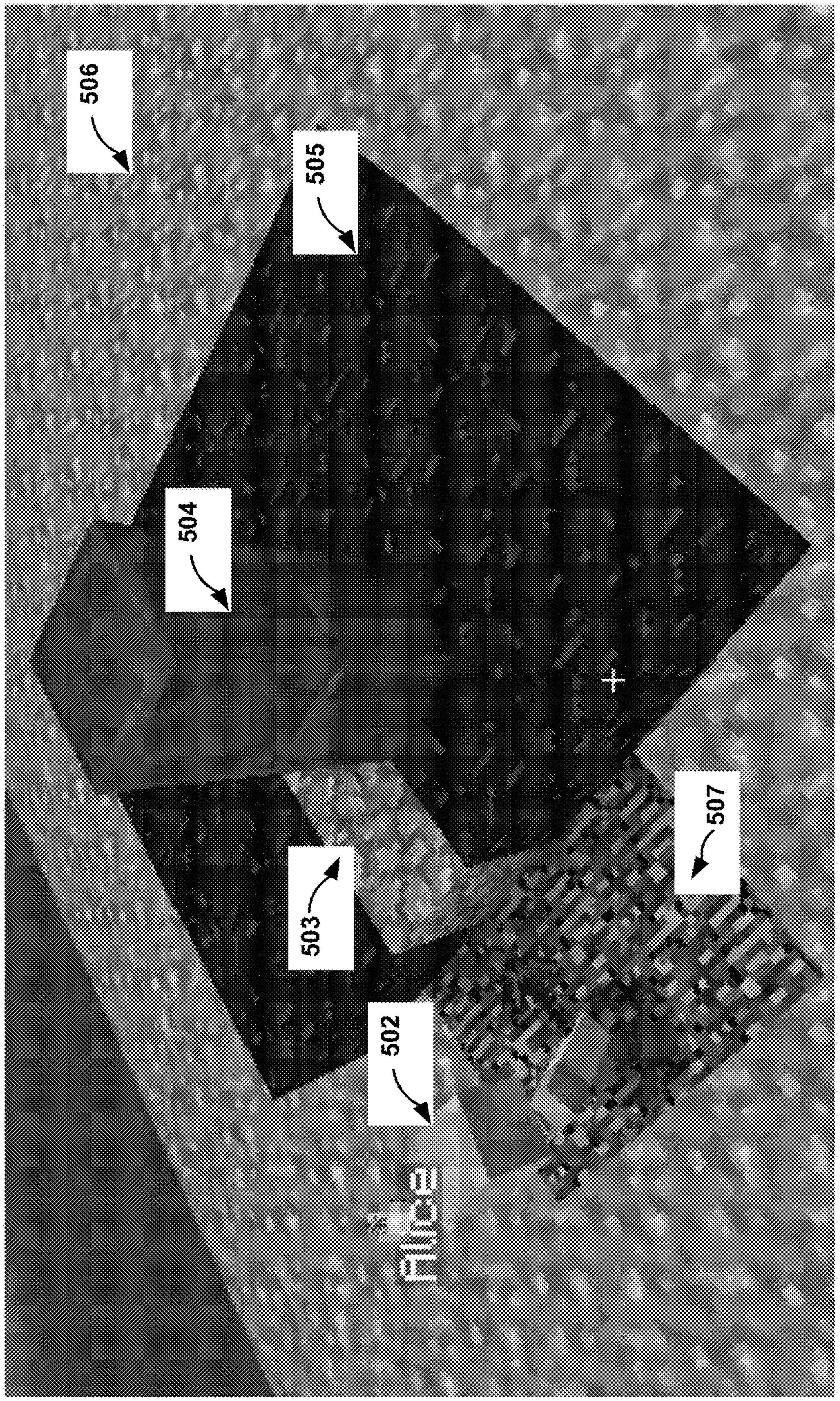
FIG. 5 is an illustration depicting an example environment for training a reinforcement learning system in accordance with the techniques of the disclosure.

FIG. 5 is an illustration depicting an example environment for training a reinforcement learning system in accordance with the techniques of the disclosure. The example environment of FIG. 5 is an artificial, 3-dimensional (3D) environment from the computer game Minecraft (available at https://minecraft.net). In Minecraft, the world is composed of different types of blocks, such as bedrock, cobblestone, logs, or lava. The game features basic mechanics that enable a variety of causal interactions between an avatar (e.g., a human player or an autonomous agent) and the blocks in the environment. For example, an avatar may use pickaxes to mine ore, axes to remove trees, or may place and remove blocks within the environment. Game environments are excellent experimental platforms because they typically are controlled domains, generally inexpensive, and act as semi-realistic proxies for real-world scenarios. Minecraft, in particular, offers a highly flexible, controllable, and extensible environment. Further Minecraft supports a wide array of possible interactions that enable modeling ranging from simple tasks to complex multi-goal problems. Thus, the Minecraft environment provides an ability to create a training regime that uses simple advice templates and complex environment exploration. In an example implementation, Project Malmo (available from https://www.microsoft.com/en-us/research/project/project-malmo/) is used to provide an instrumented artificial intelligence experimentation platform that interfaces with the Minecraft environment.

In the example of FIG. 5, a system, such as system 100 of FIG. 1, uses advice to scaffold a reactive learning system for improved learning. As depicted in the example of FIG. 5, a reinforcement learning system uses the discrete action mode of Project Malmo to simplify the percept and action-learning problem. For example, an autonomous agent, such as machine learning system 102 of FIG. 1, is configured to operate avatar 502 within a Minecraft environment. The autonomous agent can move avatar 502 forward and backward in one-block steps, turn avatar 502 in 90-degree increments, and/or control avatar 502 to use a pickaxe tool to remove cobblestone-type blocks facing avatar 502.

As depicted in the illustration of FIG. 5, avatar 502 is located within a test arena created within the Minecraft environment. FIG. 5 depicts the test arena, from a point of view of a third-party observer. The test arena of FIG. 5 includes a small island surrounded by lava blocks 506. The objective of the training episode illustrated in FIG. 5 is for avatar 502 to step forward, remove cobblestone block 503 (grey) with a pickaxe, and touch the column 504 of lapis blocks (blue). If the reinforcement learning system accomplishes the objective by destroying cobblestone blocks 503 and moving to touch column 504 of lapis blocks, the training episode ends, and the reinforcement learning system earns a large positive reward. Falling into lava 506 is instantly lethal. If avatar 502 falls into lava the training episode terminates, and the reinforcement learning system accrues a large negative reward. Walls 505 of obsidian blocks (black) and floor 507 of bedrock blocks (grey) are indestructible and impassable. To incentivize exploration, reinforcement learning system earns a small negative reward with each step. The maximum duration for each run was set to ten seconds. In this example, the reinforcement learning system uses the DQN algorithm implemented in Keras-RL (available from https://github.com/keras-rUkeras-r1). The DQN algorithm is further modified to incorporate synthetic episode replay buffer 122 for synthetic episodes 118 of FIG. 1.

Learning basic percepts from visual input has proven to be a challenge for complex game environments. Accordingly, in the example of FIG. 5, a reinforcement learning system uses observations of block identities within a rectangular volume centered on avatar 502. This environment encompasses a volume seven blocks wide, seven blocks long, and two blocks high, enabling the reinforcement learning system to observe the layer of blocks constituting the floor and a layer of blocks one unit above. Thus, the reinforcement learning system may focus on receiving advice rather than processing visual input. However, in other examples, a reinforcement learning system may perform visual identification of the blocks, such as by examining pixels.

In one example, a human user manually frames advice in the form of simple templates 108 (advice templates) that can be reified with elements from an operating environment of machine learning system 102. Templates 108 comprise a generic setup with corresponding scripts for generating sequences of actions and rewards. Synthetic episode generation module 114 generates observations in the form of synthetic episodes 118 by running the scripted actions of the templates in a simplified recording environment. In the saliency-masked condition, synthetic episode generation module 114 further applies saliency masking to synthetic episodes 118 to cull information that is extraneous to the lesson. Synthetic episode generation module 114 inserts the generated synthetic episodes 118 in synthetic episode replay buffer 122 for subsequent replay by reinforcement learning engine 110.

To achieve the objective of the training episode illustrated in FIG. 5, human advice 104 uses basic types of advice identified in several online Minecraft walkthroughs and playing guides. Two examples of advice templates are used in the example of FIG. 5 for use by the autonomous agent controlling the avatar within the Minecraft environment: 1) Avoid Contact; and 2) Approach. In the example of FIG. 5, reinforcement learning engine 110 deliberately did not receive coding advice for removing obstacles (e.g., cobblestone blocks 503) with the pickaxe of the avatar. This was done to assess how well reinforcement learning engine 110 may learn to integrate synthetic episodes 118, that contain no explicit information about obstacle removal, with experiential episodes 120, that contain experience in an environment that requires obstacle removal.

In the example of FIG. 5, each template 108 comprises one or more arguments, a setting which describes how specific blocks and the avatar are situated, and a script of actions to be performed. Example templates 108 are set forth in Table 2 below.

TABLE 2

| Advice Template | Setting | Script |
|---|---|---|
| Avoid Contact (X) | Avatar is near X. | Agent moves avatar to contact X. |
| Approach (X, D) | X is within D blocks of Avatar | Agent moves avatar to contact X. |

For the scenario of FIG. 5, advice templates 108 are reified into parameterized templates 113, depicted below:

Avoid Contact (Lava): Avoid contact between avatar 502 and lava blocks 506, with contact earning a negative reward (−100).

Approach (Lapis Column, D): Approach and touch column 504 of lapis blocks within D blocks of avatar 502. Contact earns a positive reward (+100), with incrementally increasing reward for moving toward the goal.

Reinforcement learning system 110 gathered observations for synthetic episodes 118 by having executed scripted actions in a recording environment. The recording environment is a simple flat plane with a floor composed of bedrock blocks. Unlike typical reinforcement learning, the recording environment is different and separate from the test arena depicted in FIG. 5.

Figure 6B:
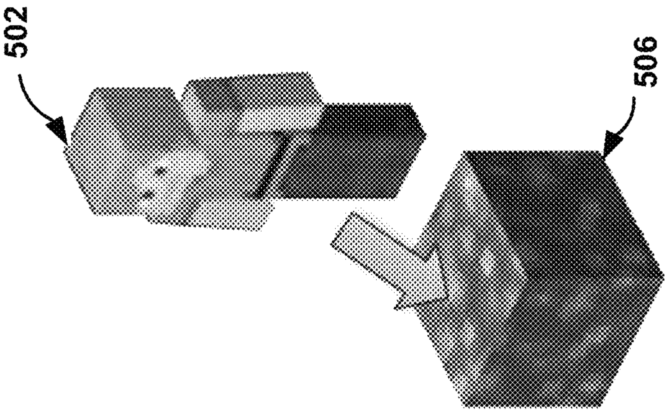
FIGS. 6A-6B are illustrations depicting an example of saliency masking in accordance with the techniques of the disclosure.
Figure 6A:
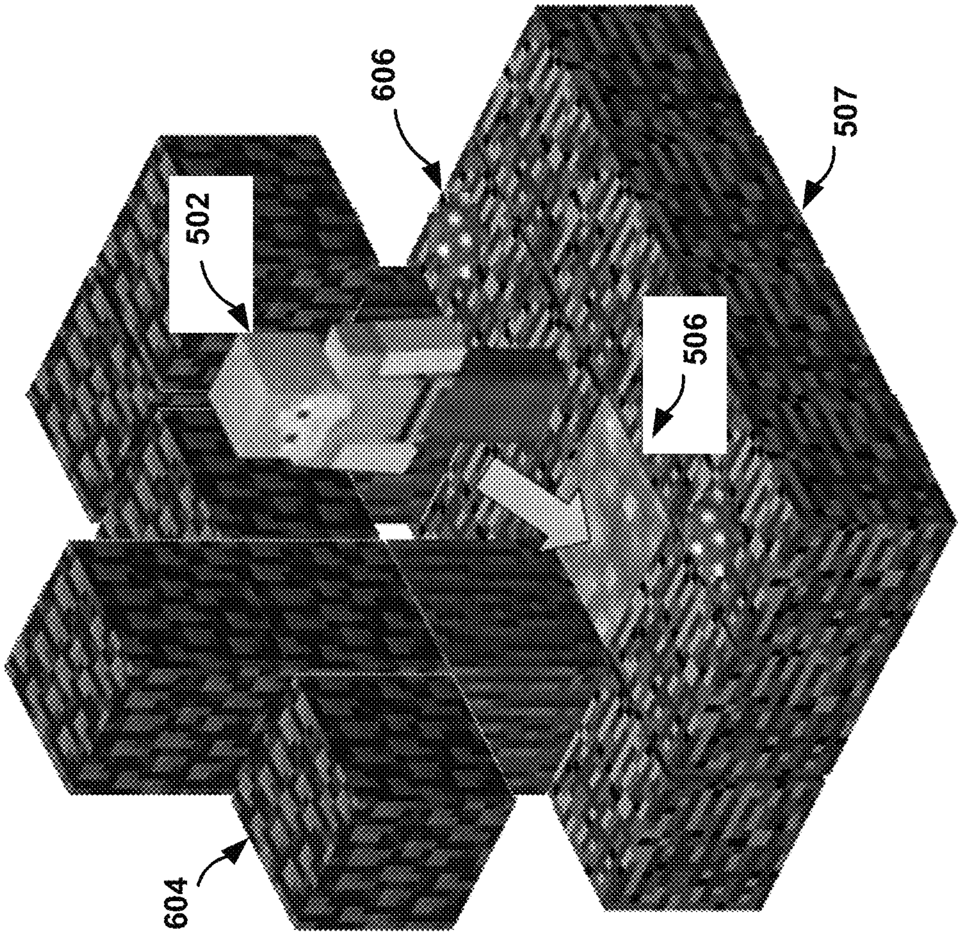

FIGS. 6A-6B are illustrations depicting an example of saliency masking in accordance with the techniques of the disclosure. Specifically, FIG. 6A depicts an example Minecraft environment including avatar 502, lava 506, bedrock blocks 507, tree blocks 604, and mushroom 606. FIG. 6B depicts the example Minecraft environment of FIG. 6A after applying saliency masking to cull irrelevant data, such as bedrock blocks 507, tree blocks 604, and mushroom 606, such that only avatar 502 and lava 506 remain.

When collecting observations for advice, such as the "Avoid Contact (Lava)" advice of the foregoing example, machine learning system 102 may either use full observations taken in the recording environment when executing a training script (as depicted in FIG. 6A) or apply saliency masking (as depicted in FIG. 6B). Standard observations incorporate not just elements such as lava block 606, the key point of this advice, but also extraneous blocks such as bedrock blocks 507, tree blocks 604, and mushroom 606. Saliency masking removes all nonessential blocks from the observation, leaving just what is needed to convey the lesson.

Saliency masking can be considered a form of background subtraction, where portions of an observation deemed irrelevant to performing a task are removed. For example, a machine-learning system configured to perform image-based classification of car makes and models can simplify the learning problem by using background subtraction to identify which pixels are part of the background (e.g., non-vehicle parts of an image). The machine learning system may set these background elements to zero, which effectively removes the background elements from the analyzed parts of the image and allows the machine learning system to learn by focusing solely on vehicles.

In the examples of FIGS. 6A-6B, non-salient blocks are represented in a recording environment as a special type of block (e.g., a "background" block). Template resolution module 106 filters out the background blocks when processing scripted observations. For example, template resolution module 106 preserves only the objects used to reify templates 108 (e.g., avatar 502 and lava 506 for the Avoid Contact (Lava) template described above) and masks all other world elements in the observation (e.g., bedrock blocks 507, tree blocks 604, and mushroom 606) by converting these elements to zeros. For example, FIG. 6A depicts an example environment prior to applying saliency masking. After applying saliency masking, as depicted in FIG. 6B, the saliency masking operation effectively removes all blocks from the observation other than avatar 502 and lava block 506.

Figure 7:
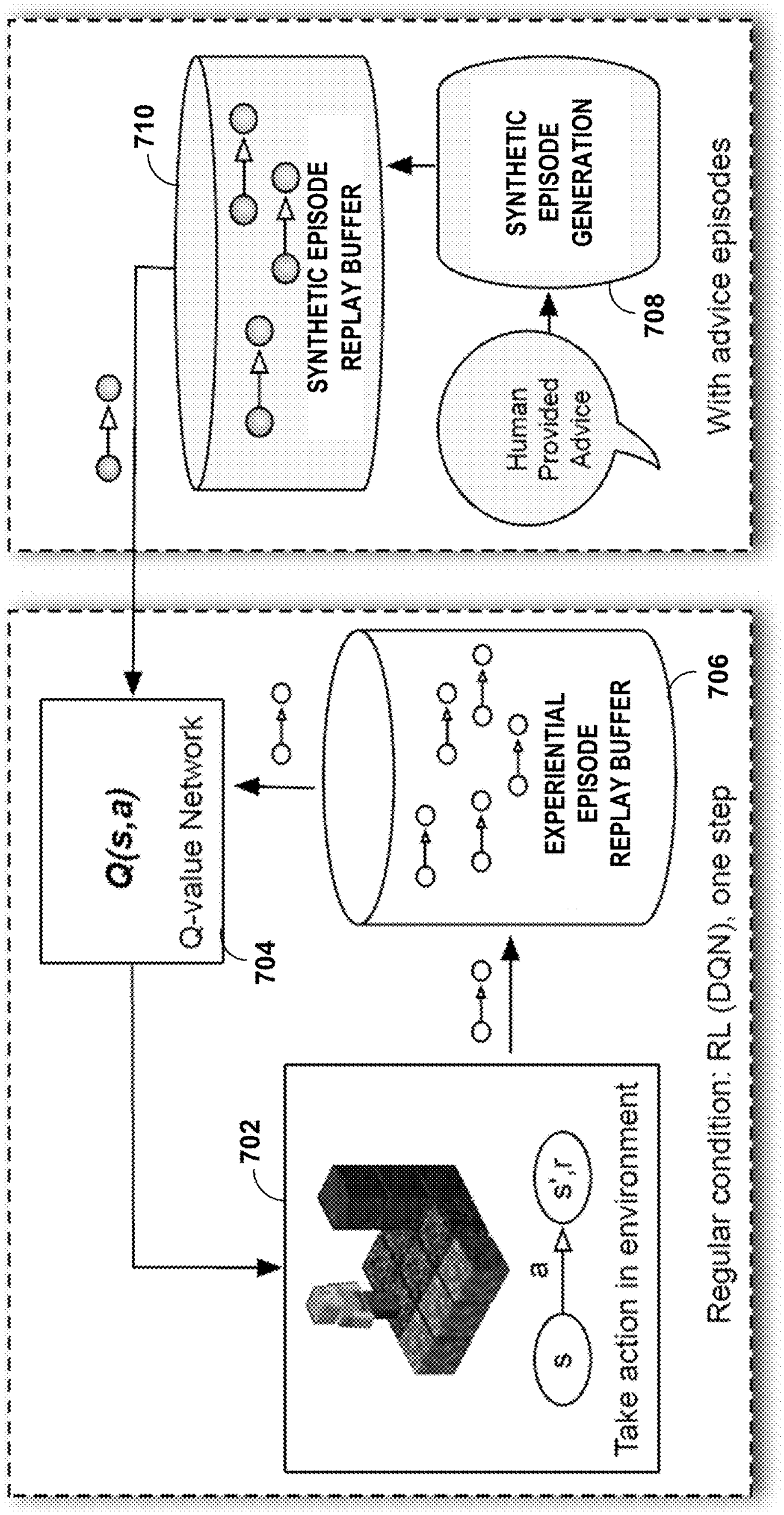
FIG. 7 is a block diagram illustrating an example methodology for training a deep Q-learning network (DQN) with synthetic episodes and experiential episodes in accordance with the techniques of the disclosure.

FIG. 7 is a block diagram illustrating an example methodology for training a DQN with synthetic episodes and experiential episodes in accordance with the techniques of the disclosure.

In some examples, reinforcement learning engine 110 adheres to a training and testing protocol. For example, as depicted in FIG. 7, for each training step, reinforcement learning engine 110 selects an action to take (702). In some examples, reinforcement learning engine 110 selects an action at random according to a Boltzmann distribution. This distribution of actions derives the probability of an action a given the current state s from the current Q-value estimates, Q(s,a). In the case of DQN, a Q-value neural network is trained to approximate the Q-values (704):

$$Pr(a \mid s) = \frac{e^{Q(s,a)}}{\Sigma a' \ e^{Q(s,a')}}$$

Machine learning system 102 collects an experiential tuple <s, a, s', r> describing a start state s, action taken a, resulting state s', and reward r, and stores the tuple in experiential episode replay buffer 124 (706). Reinforcement learning engine 110 samples a tuple from experiential episode replay buffer 124 and uses the tuple to update the Q-value network's parameters.

When synthetic episodes 118 are used in accordance with the techniques of the disclosure, template resolution module 106 converts human-provided advice 104 into parameterized templates 113, and synthetic episode generation module 114 generates synthetic episodes 118 from the parameterized templates 113 (708). Synthetic episode generation module 114 inserts the tuples corresponding to synthetic episodes 118 into synthetic episode replay buffer 112 (710).

As one example, at each step of learning by reinforcement learning engine 110, reinforcement learning engine 110 samples two tuples, e.g., one from experiential episode replay buffer 124, the other from synthetic episode replay buffer 112. In other examples, reinforcement learning engine 110 samples tuples of experiential episode replay buffer 124 and tuples of synthetic episode replay buffer 112 in according to a ratio to one another or in different proportions to one another. Reinforcement learning engine 110 uses both types of tuples to update the Q network parameters. The testing procedure is illustrated in further detail below with respect to FIG. 8.

In an example training session for machine learning system 102, reinforcement learning engine 110 runs 20 trials for each experimental condition. Each trial includes 1000 training steps. At every 100 steps of training, machine learning system 102 performs a test run for performance assessment, for a total of 10 test runs per trial. For each test run, reinforcement learning engine 110 was evaluated at that stage of training by using a greedy action-selection policy, which selects the action with the maximal Q-value. The metric of test performance was whether the machine learning system 102 reached the goal (success) or did not reach the goal (failure). Test outcomes were combined to assess the probability of completion after a given number of training steps.

Figure 8:
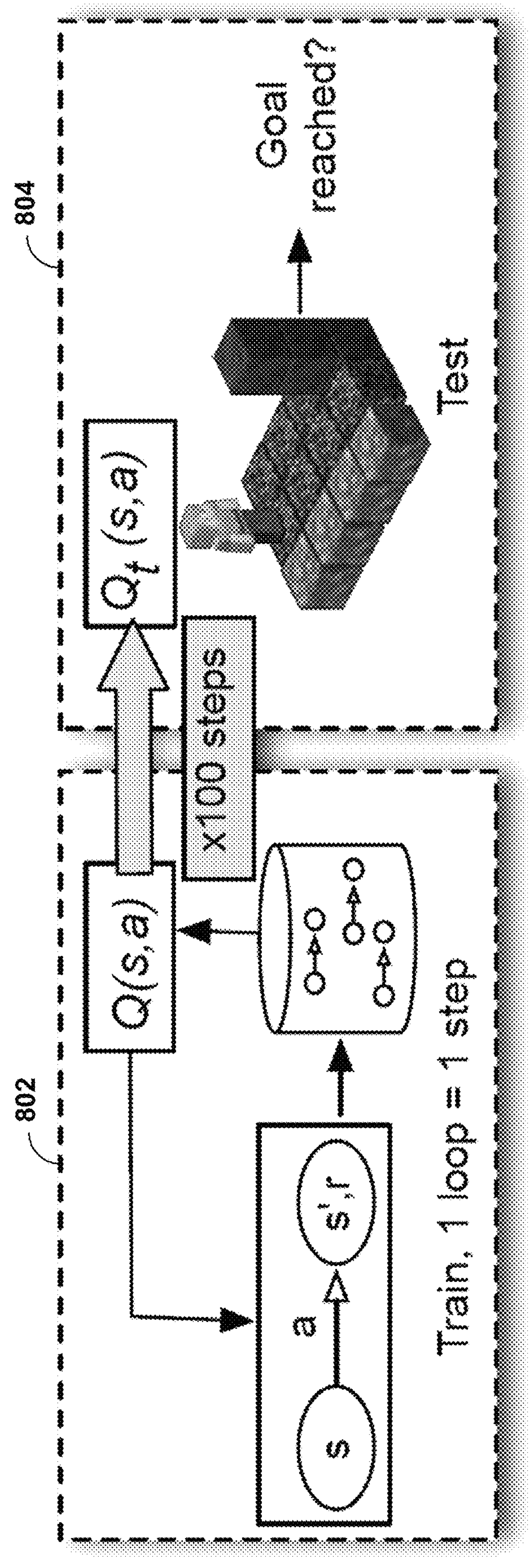
FIG. 8 is a block diagram illustrating an example methodology for testing a DQN trained using the methodology of FIG. 7.

FIG. 8 is a block diagram illustrating an example methodology for testing a DQN trained using the methodology of FIG. 7. Specifically, FIG. 8 illustrates a test protocol for a single trial of the training methodology depicted above in FIG. 7. As described above, after 100 steps of training (802), a machine learning system uses a current Q-value network, $Q_t(s,a)$, to execute a test in the environment (804). The machine learning system selects actions according to a greedy policy intended to maximize reward, unlike the exploration-focused stochastic policy described with respect to FIG. 7 for training. When the test concludes, the machine learning system records whether it was able to reach the goal.

In the example of FIG. 8, three types of machine learning systems were evaluated: 1) a standard DQN agent (e.g., a reinforcement learning system that used only experiential episodes); 2) a DQN agent augmented with synthetic episodes (e.g., a reinforcement learning system that used both experiential episodes and synthetic episodes); and 3) a DQN agent augmented with saliency-masked synthetic episodes (e.g., a reinforcement learning system that used both experiential episodes and synthetic episodes and implemented saliency masking). Each machine learning system performed 20 trials (one trial equaling 1000 training steps) for each experimental condition, and the performance is evaluated at every 100 steps. Because of the highly stochastic nature of reinforcement learning, each machine learning system used bootstrapping with a sample size of 1000 to derive a mean probability and standard errors of the system reaching the goal. Even with 20 separate trials, there is a non-trivial amount of stochasticity in the learning, as evidenced by fluctuations in goal probability.

Figure 9:
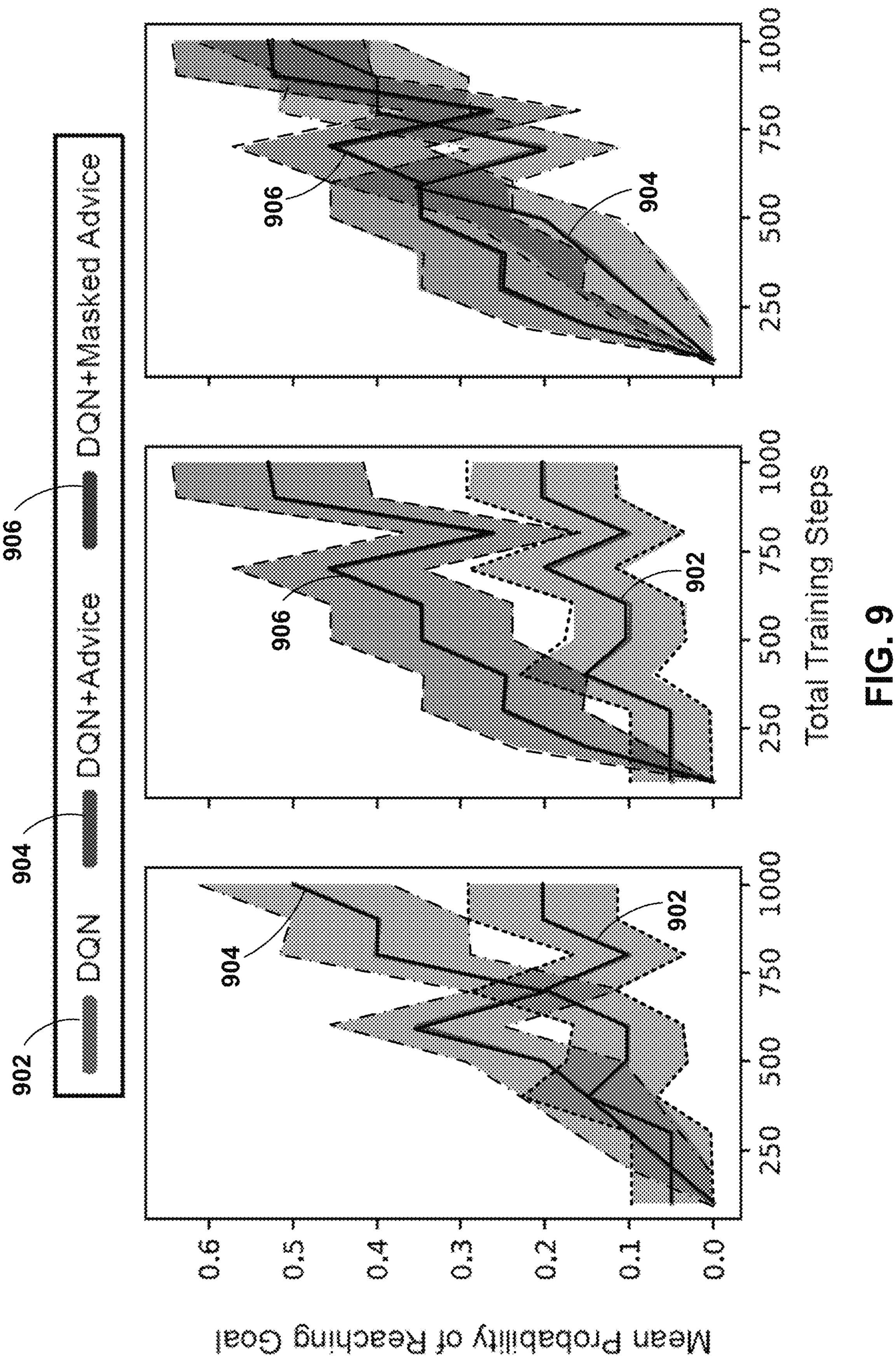
FIG. 9 is a graph illustrating the performance of the example reinforcement learning system of FIGS. 7 and 8.

FIG. 9 is a graph illustrating the performance of the example reinforcement learning system of FIGS. 7 and 8. Specifically, FIG. 9 depicts experimental results and a comparison of the mean probability of reaching the goal against total training steps for each of the three types of machine learning systems, a standard DQN agent 902 (e.g., a reinforcement learning system that used only experiential episodes), a DQN agent 904 augmented with synthetic episodes (e.g., a reinforcement learning system that used both experiential episodes and synthetic episodes), and a DQN agent 906 augmented with saliency-masked synthetic episodes (e.g., a reinforcement learning system that used both experiential episodes and synthetic episodes and implemented saliency masking). FIG. 9 depicts a mean probability of reaching the goal as a function of a number of training steps. Shaded regions of FIG. 9 correspond to one standard error of the mean (the estimated probability).

FIG. 9 demonstrates the effectiveness of the use of synthetic episodes for training a reinforcement learning system over the use of a reinforcement learning system that uses purely experiential episodes. For example, compared to the standard DQN agent 902, DQN agent 904 augmented with synthetic episodes ($\chi^2(1)=7.20$, $p=0.007$) and DQN agent 906 augmented with saliency-masked synthetic episodes ($\chi^2(1)=9.04$, $p=0.003$) achieved a higher overall probability of goal completion by the end of the 1000 steps.

FIG. 9 further compares the effectiveness of the use of synthetic episodes versus the use of saliency-masked synthetic episodes. As depicted in FIG. 9, the use of saliency-masked synthetic episodes did not substantially improve performance compared to the use of synthetic episodes without saliency masking, as illustrated by a similar performance difference at the final test, $\chi^2(1)=0.10$, $p=0.752$. However, as seen FIG. 9, the use of saliency-masked synthetic episodes yields a better mean probability of reaching the goal at most of the evaluated training steps, particularly in the early stages, such as at 300 steps of training, $\chi^2(1)=5.00$, $p=0.025$. The use of saliency-masked synthetic episodes also exhibits less error overlap with DQN 902 than the use of purely experiential episodes, in comparison with DQN 904, which exhibited some overlap with DQN 902. Accordingly, as depicted by FIG. 9, the use of synthetic episodes as synthetic training examples may improve the performance of a baseline reinforcement learning system.

Also of note is that the use of synthetic training examples did not harm overall performance. Because synthetic episodes were generated in an "artificial" recording environment, their corresponding observations are unlikely to have a similar distribution to experiential episodes obtained in a trial environment. Thus, this mismatch does not guarantee that the synthetic episodes will positively impact the learning rate, because synthetic episodes may have the potential to harm in-environment learning. The additional improvement in performance provided by saliency masking, assessed by comparing saliency-masked advice (e.g., DQN 906) to unmasked advice (e.g., DQN 904), was not robust but did trend towards being beneficial, particularly during earlier trials. This indicates that removal of irrelevant observational elements may help with reducing the impact of the discrepancies between observations, but this benefit may be dependent on the stage of training.

FIG. 9 also depicts a conspicuous drop in performance for both DQN 904 and DQN 906 at around 750 steps of training. One possible explanation is after a certain amount of in-environment experiences are accumulated, the synthetic episodes began to hamper experiential learning. The naive memory sampling regime described above samples memories equally from synthetic episode reply buffer 122 and experiential episode replay buffer 124 throughout training. This strategy may not be optimal because as training progresses, reinforcement learning model 112 becomes more tuned to the environment. In contrast, synthetic episodes are static and do not change throughout training. At that point, updating reinforcement learning model 112 with an equal proportion of unrealistic synthetic episodes may negatively impact learning by reinforcement learning engine 110, which in turn may cause machine learning system 102 to execute a different, or less desired, behavior. In alternative examples, synthetic episodes may be used in different manners, such as incorporating the synthetic episodes at different times during training, or adjusting the proportion of synthetic episodes to experiential episodes. Furthermore, some synthetic episodes may be more valuable (or less harmful) at certain points of learning, such that a more nuanced sampling strategy may be fruitful.

The techniques of the disclosure enable a computing device to transform declarative advice into a representation that can guide the learning of an autonomous reactive learning agent, such as a reinforcement learning system. The use of templates described herein is motivated by the need to operationalize user guidance into a form that can be used by the autonomous agent. However, rather than convert advice directly into rules or constraints that directly influence the system's behavior, the approach described herein converts such advice into synthetic episodes which may be used as training examples for the reinforcement learning system. An advantage of the techniques set forth herein is that the use of synthetic episodes is agnostic to the underlying learning system, enabling the use of such synthetic episodes in any system that learns from training examples.

In approaches that do not use synthetic episodes, the role of a human user is that of a trainer, and thus frequent interaction is required. In contrast, the techniques disclosed herein may use human guidance more as general advice. Furthermore, the instructional advice framework described herein may perform selective input removal through the use of saliency masking instead of having the autonomous agent attempt to learn selective input removal.

Instead of governing action selection, the system described herein uses domain models to synthesize training episodes. While this approach may not have as immediate an effect as directly governing agent policy, it requires fewer changes to existing reinforcement learning algorithms. Further, the techniques described herein allows one to model only the knowledge needed to convey the advice to the reinforcement learning system, instead of a larger dataset necessary to generate projected outcomes.

Accordingly, the techniques disclosed enable a system to apply declarative, human-like advice to enhance the performance of a reinforcement learning agent. Such a system uses a theoretical framework for how advice cannot directly interact with a reactive learning system's encapsulated knowledge representation, but such advice may be used to shape the knowledge representation of a reactive learning system through synthetic episode training examples. To implement this framework, the system described herein matches advice to templates that the system uses to generate synthetic episodes for use as "imagined" training examples. These synthetic episodes include scripted sequences of actions and observations and implement saliency masking to focus attention on the most relevant aspects of the experience. The architecture described herein allows for minimal a priori world modeling to guide a simple reinforcement learning agent. Experimental results in a Minecraft-based test environment demonstrates how the use of synthetic episodes can improve the performance of a reinforcement learning system to achieve both faster learning and a higher success rate.

The system described herein uses a synthetic episode replay buffer to store synthetic episodes, making the system independent of the specific reinforcement learning algorithm used. While the foregoing examples of reinforcement learning systems used basic Q-learning, the techniques described herein may be applied to more advanced reinforcement learning architectures, such as reinforcement learning systems that accommodate temporal abstractions and longer-range goals, option critic architectures, or other types of algorithms. The general concept of using advice templates to transform human advice into synthetic episodes for use as training examples may be applied to any learning system, including types not specifically described herein. For example, the techniques of the disclosure may be applied to systems that learn subsymbolic components of comprehensive architectures that span multiple levels of representation, such as training operator selection policies in the Soar Cognitive Architecture reinforcement learning system.

As with other DQN approaches using experiential episode replay, the system described herein randomly samples from the synthetic episode replay buffer and the experiential episode replay buffer. However, studies in episodic memory suggest that humans selectively retrieve memories, choosing the ones most pertinent to a given situation and using these for learning. A system as described herein may be expanded to implement case-based retrieval of synthetic and/or experiential episodes as a form of a specialized situation-aware critic, and evaluate the effect of selected episodes on learning. The system described herein uses templates to reinforce or to punish a behavior, but not both. However, humans sometimes give advice that is more nuanced, e.g., "do not brake a vehicle suddenly unless the vehicle is about to hit an object." Thus, the system described herein may be expanded to handle such advice (e.g., advice that describes behavior that may be reinforced in some situations and punished in other situations).

Given system explanations that surface problems in the knowledge of an autonomous agent, the natural next step is for humans to correct that knowledge and hence, this effort. We note that a duality exists between explanation and advice: good explanations often act as good advice. Furthermore, the system described herein may use explanation from human users to elicit more effective advice through the use of introspection mechanisms.

Figure 10:
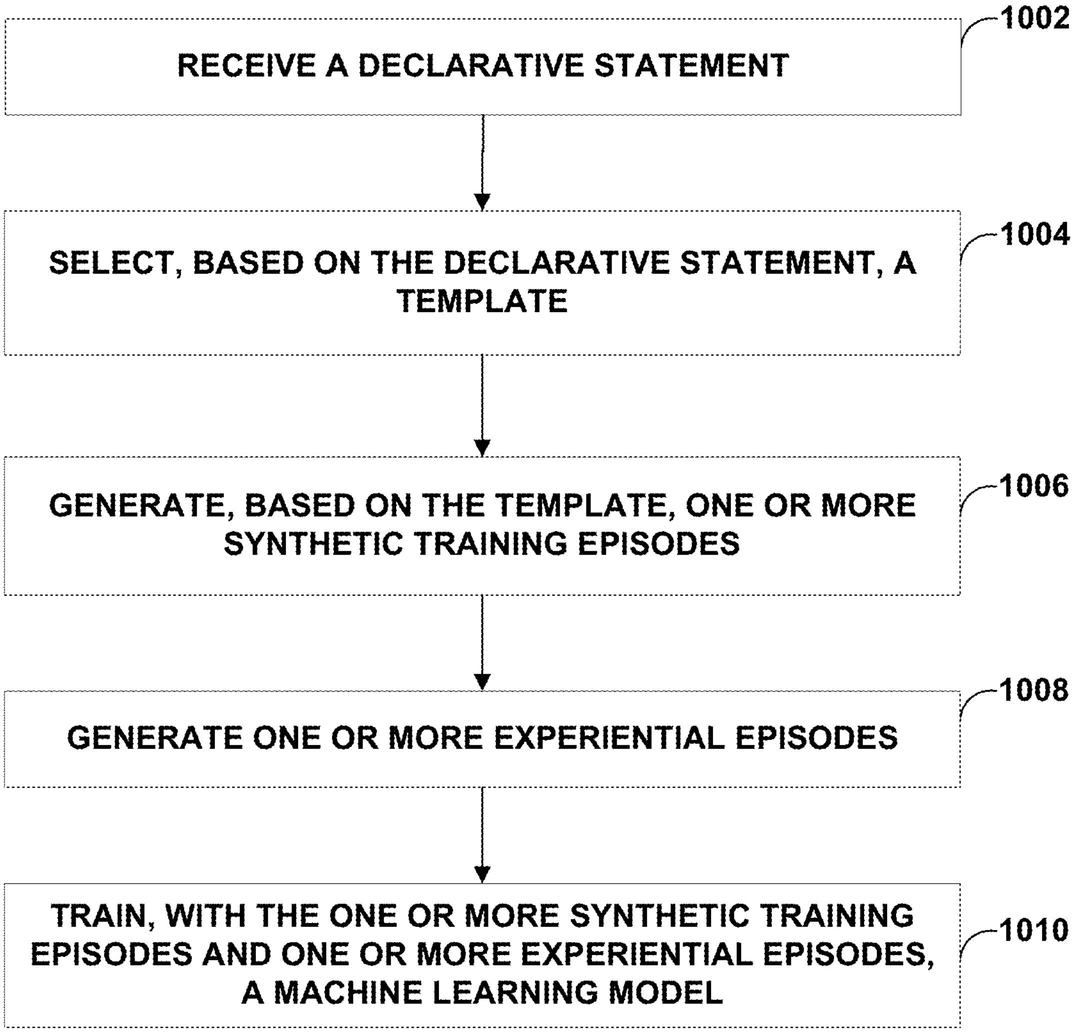
FIG. 10 is a flowchart illustrating an example operation in accordance with the techniques of the disclosure. For convenience.

FIG. 10 is a flowchart illustrating an example operation in accordance with the techniques of the disclosure. For convenience, FIG. 10 is described with respect to FIG. 2.

In the example of FIG. 10, computation engine 200 of computing device 230 receives, via input devices 202, advice from a human user in the form of a declarative statement (1002). In some examples, the declarative statement specifies one or more key elements and a lesson to be learned from the key elements. In some examples, the declarative statement specifies at least one or one or more constraints on desirable behavior for the machine learning model.

Template resolution module 106 selects, based on the declarative statement, a template 108 of a plurality of templates 108 (1004). Each template 108 includes at least one template action that can be performed within an environment and one or more variables. The template action comprises a sequence of interactions between the one or more variables. Template resolution module 106 resolves the one or more variables with the key elements of the received declarative statement. Further, template resolution module 106 defines the sequence of interactions specified by template 108 with the resolved one or more variables to generate a parameterized template 113.

Synthetic episode generation module 114 generates, based on parameterized template 113, one or more synthetic training episodes 118 (1006). In some examples, synthetic episode generation module 114 generates, based on parameterized template 113 and an domain-specific action model for the environment of machine learning system 102, the one or more synthetic training episodes 118. In some examples, each synthetic training episode 118 includes at least one action and at least one reward. In some examples, synthetic episode generation module 114 generates synthetic training episodes 118 by applying saliency masking to preliminary synthetic training episodes to remove extraneous information from the preliminary synthetic training episodes.

Synthetic episode generation module 114 stores the one or more synthetic training episodes 118 in synthetic episode replay buffer 122. In some examples, synthetic episode generation module 114 stores the one or more synthetic training episodes 118 as one or more synthetic tuples. In some examples, each synthetic tuple is in the form <s, a, s', r> and comprises a synthetic initial state s of the environment, a synthetic action a performed by machine learning system 102, a synthetic resulting state s' of the environment, and a synthetic resulting reward r for machine learning system 102.

Observation module 116 generates one or more experiential episodes 120 (1008). Observation module 116 generates each experiential episode 120 from past actions performed by machine learning system 102 and observed results of the actions. In some examples, each experiential episode 120 includes at least one action and at least one reward. In some example implementations, step 1006 may be performed prior to step 1008, after step 1008, in parallel to step 1008, or in any other order not expressly described herein.

Observation module 116 stores the one or more experiential episodes 120 in experiential episode replay buffer 124. In some examples, Observation module 116 stores the one or more experiential episodes 120 as one or more experiential tuples. In some examples, each experiential tuple is in the form <s, a, s', r> and comprises a historical initial state s of the environment, a historical action a performed by machine learning system 102, a historical resulting state s' of the environment, and a historical resulting reward r for machine learning system 102.

Reinforcement learning engine 110 trains reinforcement learning model 112 with one or more experiential episodes 120 and one or more synthetic episodes 118 to perform one or more actions within the environment (1010). For example, reinforcement learning engine 110 may train reinforcement learning model 112 by retrieving one or more synthetic tuples from synthetic episode replay buffer 122 and one or more experiential tuples from experiential episode replay buffer 124 and replaying the synthetic episodes 118 and experiential episodes 120 described by the respective synthetic tuples and experiential tuples to reinforcement learning model 112. In some examples, reinforcement learning engine 110 alternates between training reinforcement learning model 112 with a synthetic training episode 118 and training reinforcement learning model 112 with an experiential episode 120. In an example where reinforcement learning model 112 is a DQN, reinforcement learning engine 110 updates one or more Q-value network parameters of reinforcement learning model 112 with the one or more synthetic and experiential tuples of the one or more synthetic episodes 118 and experiential episodes 120.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term “processor” or “processing circuitry” may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A computing system comprising:

an input device configured to receive a declarative statement;

a computation engine comprising processing circuitry, wherein the computation engine is configured to select, based on the declarative statement, a template that includes at least one template action that can be performed within an environment, wherein the computation engine is configured to generate, based on the template, one or more synthetic training episodes, each synthetic training episode comprising at least one action and at least one reward; and a reinforcement learning system configured to train, with the one or more synthetic training episodes, a reinforcement learning model to perform one or more actions within the environment.

2. The computing system of claim 1, wherein the declarative statement specifies one or more key elements, wherein the template further comprises one or more variables, wherein the at least one template action comprises a sequence of interactions between the one or more variables, wherein to generate, based on the template, the one or more synthetic training episodes, the computation engine is configured to:

resolve the one or more variables with the one or more key elements of the declarative statement; and define the sequence of interactions with the resolved one or more variables to generate the one or more synthetic training episodes.

3. The computing system of claim 1, wherein to generate, based on the template, the one or more synthetic training episodes, the computation engine is configured to:

generate, based on the template, one or more preliminary synthetic training episodes; and apply, to the one or more preliminary synthetic training episodes, saliency masking to remove extraneous information from the one or more preliminary synthetic training episodes to generate the one or more synthetic training episodes.

4. The computing system of claim 3, wherein the machine learning system is a reinforcement learning system.

5. The computing system of claim 1, wherein the reinforcement learning model is a Deep Q-Network (DQN), wherein each of the one or more synthetic training episodes comprises a tuple, and wherein to train, with the one or more synthetic training episodes, the reinforcement learning model to perform the one or more actions within the environment, the reinforcement learning system is further configured to update one or more Q-value network parameters of the DQN with one or more tuples of the one or more synthetic training episodes.

6. The computing system of claim 1, wherein the declarative statement defines at least one or one or more constraints on desirable behavior for the reinforcement learning model.

7. The computing system of claim 1, wherein the input device is configured to receive the declarative statement from a human user.

8. A computing system comprising:

an input device configured to receive a declarative statement;

a machine learning system comprising a machine learning model; and a computation engine comprising processing circuitry, wherein the computation engine is configured to select, based on the declarative statement, a template that includes at least one template action that can be performed within an environment, wherein the computation engine is configured to generate, based on the template, one or more synthetic training episodes, each synthetic training episode comprising at least one action and at least one reward, wherein the computation engine is further configured to generate one or more experiential training episodes, wherein each experiential training episode comprises at least one action and at least one reward and wherein each experiential training episode is collected by the machine learning model from past actions performed by the machine learning model; and wherein the machine learning system configured to train, with the one or more synthetic training episodes and the one or more experiential training episodes, a machine learning model to perform one or more actions within the environment.

9. The computing system of claim 1, wherein the one or more actions comprise at least one of:

1) a task to navigate an autonomous vehicle through the environment;

2) a task to move an avatar within an artificial reality environment; or 3) a task to configure a computer or applications.

10. The computing system of claim 8, wherein the computing system further comprises an experiential episode replay buffer configured to store each of the experiential training episodes as an experiential tuple, and wherein each experiential tuple defining the respective experiential training episode comprises a historical initial state of the environment, a historical action performed by the machine learning model, a historical resulting state of the environment, and a historical resulting reward for the machine learning model.

11. The computing system of claim 10, wherein the computing system further comprises a synthetic episode replay buffer configured to store each of the synthetic training episodes as a synthetic tuple, and wherein each synthetic tuple defining the respective synthetic training episode comprises a synthetic initial state of the environment, a synthetic action performed by the machine learning model, a synthetic resulting state of the environment, and a synthetic resulting reward for the machine learning model.

12. The computing system of claim 8, wherein to train the machine learning model to perform the one or more actions within the environment, the machine learning system is further configured to adapt between training the machine learning model with a synthetic training episode of the one or more synthetic training episodes and training the machine learning model with an experiential episode of the one or more experiential training episodes based on one or more parameters of the environment.

13. A computing system comprising:

an input device configured to receive a declarative statement;

a computation engine comprising processing circuitry, wherein the computation engine is configured to select, based on the declarative statement, a template that includes at least one template action that can be performed within an environment, wherein the computation engine is configured to generate, based on the template and a domain-specific action model for the environment, one or more synthetic training episodes, each synthetic training episode comprising at least one action and at least one reward; and a machine learning system configured to train, with the one or more synthetic training episodes, a machine learning model to perform one or more actions within the environment.

14. A method for training a reinforcement learning model to perform one or more actions within an environment, the method comprising:

receiving, by an input device, a declarative statement;

selecting, by a computation engine comprising processing circuitry and based on the declarative statement, a template that includes at least one template action that can be performed within the environment;

generating, by the computation engine and based on the template, one or more synthetic training episodes, each synthetic training episode comprising at least one action and at least one reward; and training, by a reinforcement learning system and with the one or more synthetic training episodes, the reinforcement learning model to perform the one or more actions within the environment.

15. The method of claim 14, wherein the declarative statement specifies one or more key elements, wherein the template further comprises one or more variables, wherein the at least one template action comprises a sequence of interactions between the one or more variables, wherein generating, based on the template, the one or more synthetic training episodes comprises:

resolving the one or more variables with the one or more key elements of the declarative statement; and defining the sequence of interactions with the resolved one or more variables to generate the one or more synthetic training episodes.

16. A method for training a machine learning model to perform one or more actions within an environment, the method comprising:

receiving, by an input device, a declarative statement;

selecting, by a computation engine comprising processing circuitry and based on the declarative statement, a template that includes at least one template action that can be performed within the environment;

generating, by the computation engine and based on the template, one or more synthetic training episodes, each synthetic training episode comprising at least one action and at least one reward;

generating, by the computation engine, one or more experiential training episodes, wherein each experiential training episode comprises at least one action and at least one reward and wherein each experiential training episode is collected by the machine learning model from past actions performed by the machine learning model; and training, by a machine learning system and with the one or more synthetic training episodes and the one or more experiential training episodes, the machine learning model to perform the one or more actions within the environment.

17. A method for training a machine learning model to perform one or more actions within an environment, the method comprising:

receiving, by an input device, a declarative statement;

selecting, by a computation engine comprising processing circuitry and based on the declarative statement, a template that includes at least one template action that can be performed within the environment;

generating, by the computation engine and based on the template and a domain-specific action model for the environment, one or more synthetic training episodes, each synthetic training episode comprising at least one action and at least one reward; and training, by a machine learning system and with the one or more synthetic training episodes, the machine learning model to perform the one or more actions within the environment.

18. The method of claim 14, wherein generating, based on the template, the one or more synthetic training episodes comprises:

generating, based on the template, one or more preliminary synthetic training episodes; and applying, to the one or more preliminary synthetic training episodes, saliency masking to remove extraneous information from the one or more preliminary synthetic training episodes to generate the one or more synthetic training episodes.

19. The method of claim 16, wherein to training the machine learning model to perform the one or more actions within the environment comprises adapting between training the machine learning model with a synthetic training episode of the one or more synthetic training episodes and training the machine learning model with an experiential episode of the one or more experiential training episodes based on one or more parameters of the environment.

20. A non-transitory, computer-readable medium comprising instructions that, when executed, are configured to cause processing circuitry of a computing system to:

execute a computation engine configured to:

receive a declarative statement;

select, based on the declarative statement, a template that includes at least one template action that can be performed within an environment; and generate, based on the template, one or more synthetic training episodes, each synthetic training episode comprising at least one action and at least one reward; and execute a reinforcement learning system configured to train, with the one or more synthetic training episodes, a reinforcement learning model to perform the one or more actions within the environment.

* * * * *